(12) United States Patent
Kimura et al.

(10) Patent No.: US 11,226,307 B2
(45) Date of Patent: *Jan. 18, 2022

(54) ELECTROPHORESIS DEVICE AND ELECTROPHORESIS METHOD

(71) Applicant: Hitachi High-Tech Corporation, Tokyo (JP)

(72) Inventors: Ryusuke Kimura, Tokyo (JP); Motohiro Yamazaki, Tokyo (JP); Hitoshi Miyata, Tokyo (JP); Hiroyuki Higashino, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/885,828

(22) Filed: May 28, 2020

(65) Prior Publication Data
US 2020/0292493 A1 Sep. 17, 2020

Related U.S. Application Data

(62) Division of application No. 15/560,395, filed as application No. PCT/JP2015/059532 on Mar. 27, 2015, now Pat. No. 10,705,046.

(51) Int. Cl.
*G01N 27/447* (2006.01)

(52) U.S. Cl.
CPC ..... *G01N 27/44743* (2013.01); *G01N 27/447* (2013.01); *G01N 27/44721* (2013.01); *G01N 27/44782* (2013.01); *G01N 27/44791* (2013.01)

(58) Field of Classification Search
CPC .......... G01N 27/447–44795; B01D 57/00–02; C02F 1/4696

(Continued)

(56) References Cited

U.S. PATENT DOCUMENTS 5,635,050 A    6/1997  Pentoney, Jr.
5,695,465 A *  12/1997  Zhu .................. A61M 5/31596
                                                604/202

(Continued)

FOREIGN PATENT DOCUMENTS

JP    2003-524747 A    8/2003
JP     2008-8621 A     1/2008

(Continued)

OTHER PUBLICATIONS

International Search Report (PCT/ISA/210) issued in PCT Application No. PCT/JP2015/059532 dated Jun. 23, 2015 with English-language translation (three (3) pages).

(Continued)

*Primary Examiner* — Bach T Dinh
(74) *Attorney, Agent, or Firm* — Crowell & Moring LLP

(57) ABSTRACT

Provided is an electrophoresis device that, by electrophoresis, feeds a sample into capillaries and optically detects the sample, the electrophoresis device being provided with capillaries, a capillary head provided at the distal end of the capillaries, a phoretic medium-filled container used for electrophoresis and filled with a phoretic medium, a guide member that covers the side surface of the phoretic medium-filled container, a seal member that seals from below the phoretic medium filled in the phoretic medium-filled container, and a plunger that presses the seal member.

10 Claims, 23 Drawing Sheets

(58) Field of Classification Search
USPC ............... 204/450–470, 546–550, 600–621, 204/643–645
See application file for complete search history.

(56) References Cited

U.S. PATENT DOCUMENTS

| | | | | |
|---|---|---|---|---|
| 6,001,230 | A | * | 12/1999 | Burolla ............ G01N 27/44782 204/451 |
| 6,027,627 | A | * | 2/2000 | Li .................... G01N 27/44782 204/451 |
| 6,364,516 | B1 | | 4/2002 | Li et al. |
| 10,705,046 | B2 | * | 7/2020 | Kimura ............ G01N 27/44782 |
| 2001/0017263 | A1 | * | 8/2001 | Shoji ................ G01N 27/44704 204/455 |
| 2003/0052074 | A1 | * | 3/2003 | Chang ................ B01L 3/50825 215/247 |
| 2004/0003997 | A1 | * | 1/2004 | Anazawa ......... G01N 27/44726 204/601 |
| 2006/0201808 | A1 | | 9/2006 | Kumagai |
| 2008/0041724 | A1 | | 2/2008 | Ozawa et al. |
| 2008/0087647 | A1 | | 4/2008 | Nakamura |
| 2009/0211911 | A1 | * | 8/2009 | Ohura .............. G01N 27/44743 204/603 |
| 2015/0210999 | A1 | | 7/2015 | Sahoyama et al. |
| 2017/0176384 | A1 | | 6/2017 | Walton |

FOREIGN PATENT DOCUMENTS

| | | | |
|---|---|---|---|
| JP | 2012120585 | * | 6/2012 |
| JP | 2013140181 | * | 7/2013 |
| JP | 5391350 | B2 | 1/2014 |
| JP | 2014-21052 | A | 2/2014 |

OTHER PUBLICATIONS

Japanese-language Written Opinion (PCT/ISA/237) issued in PCT Application No. PCT/JP2015/059532 dated Jun. 23, 2015 (three (3) pages).

* cited by examiner

[Fig. 1]
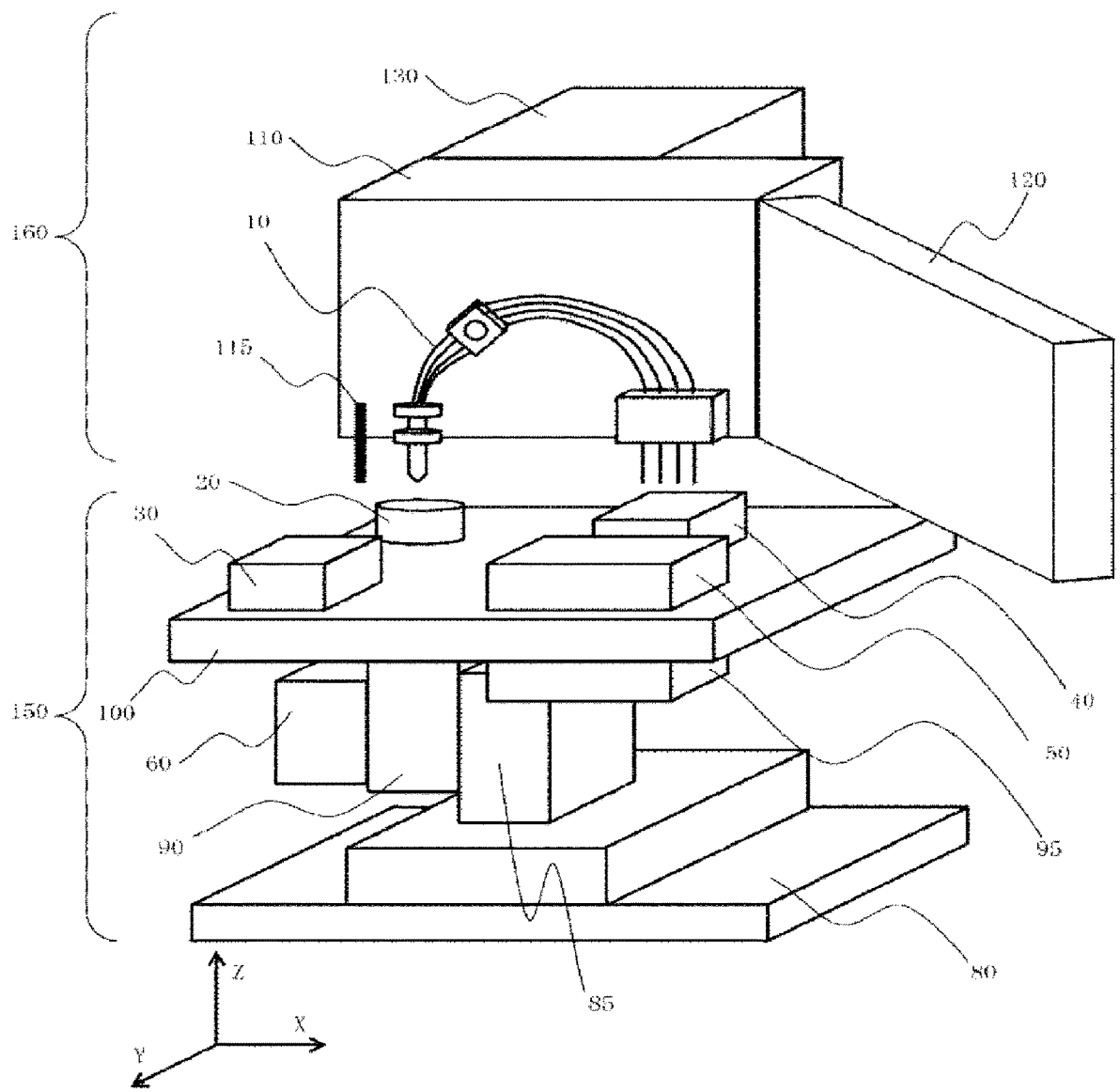

[Fig. 2]
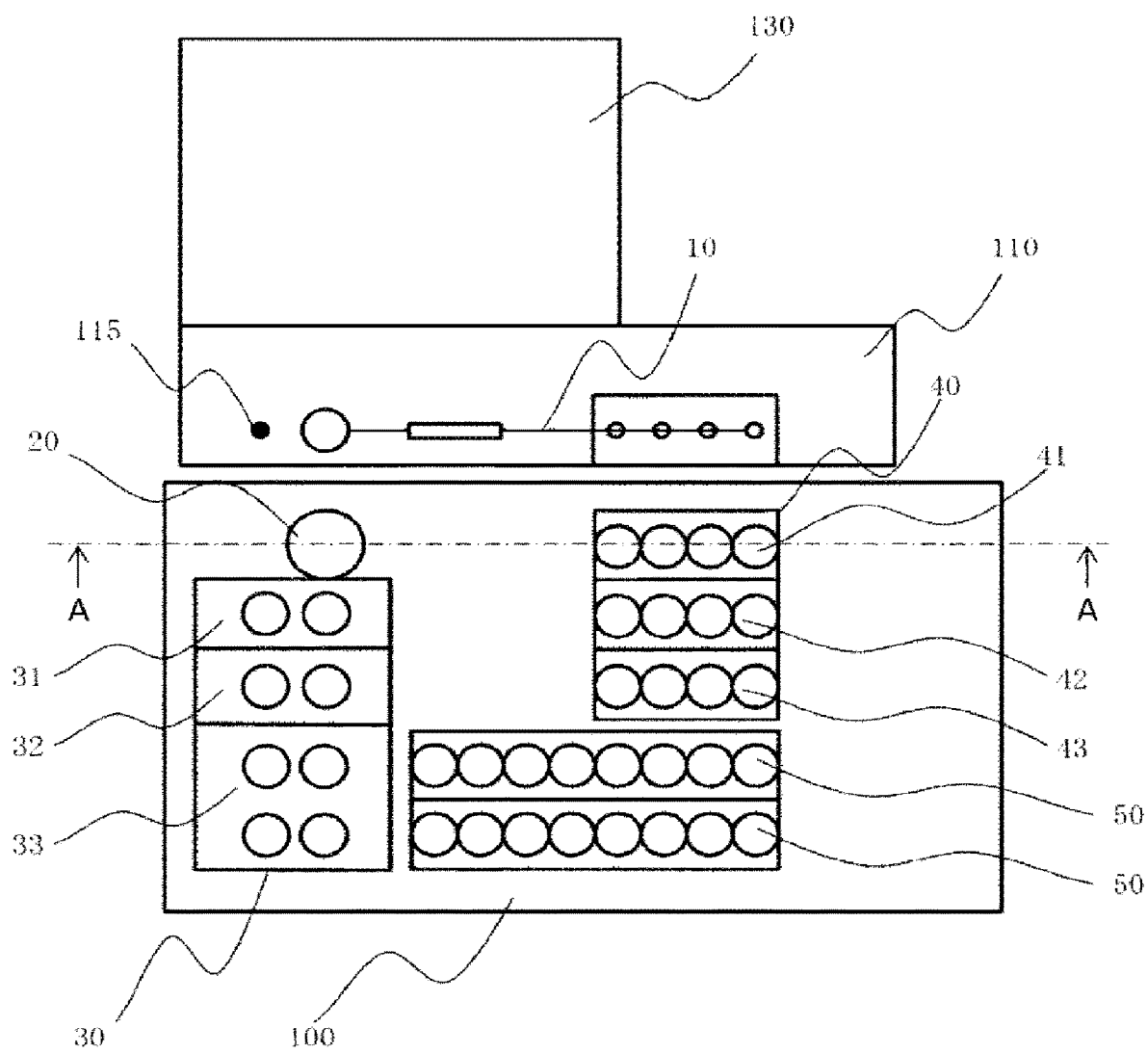

[Fig. 3]
A-A
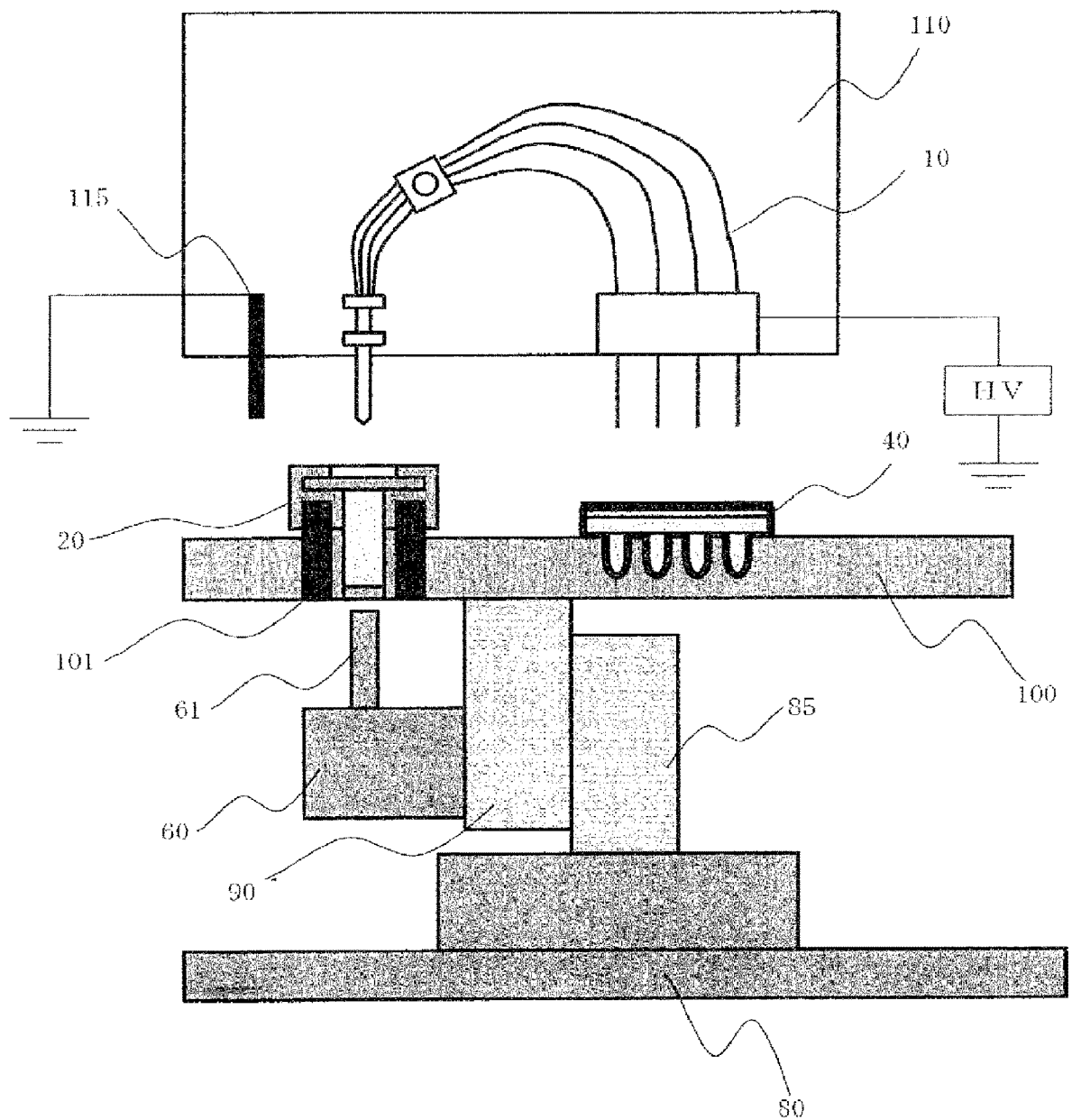

[Fig. 4]
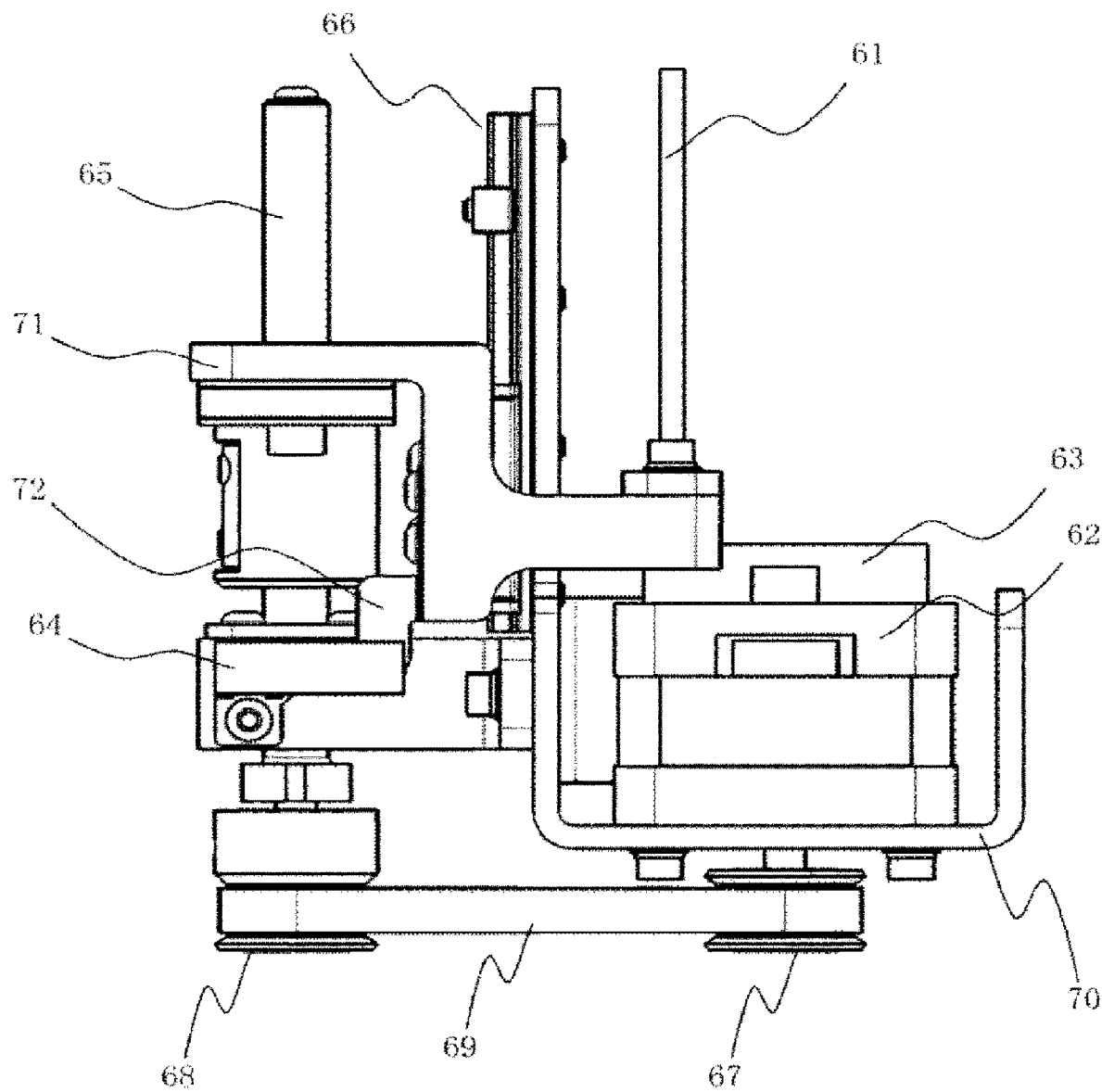

[Fig. 5]
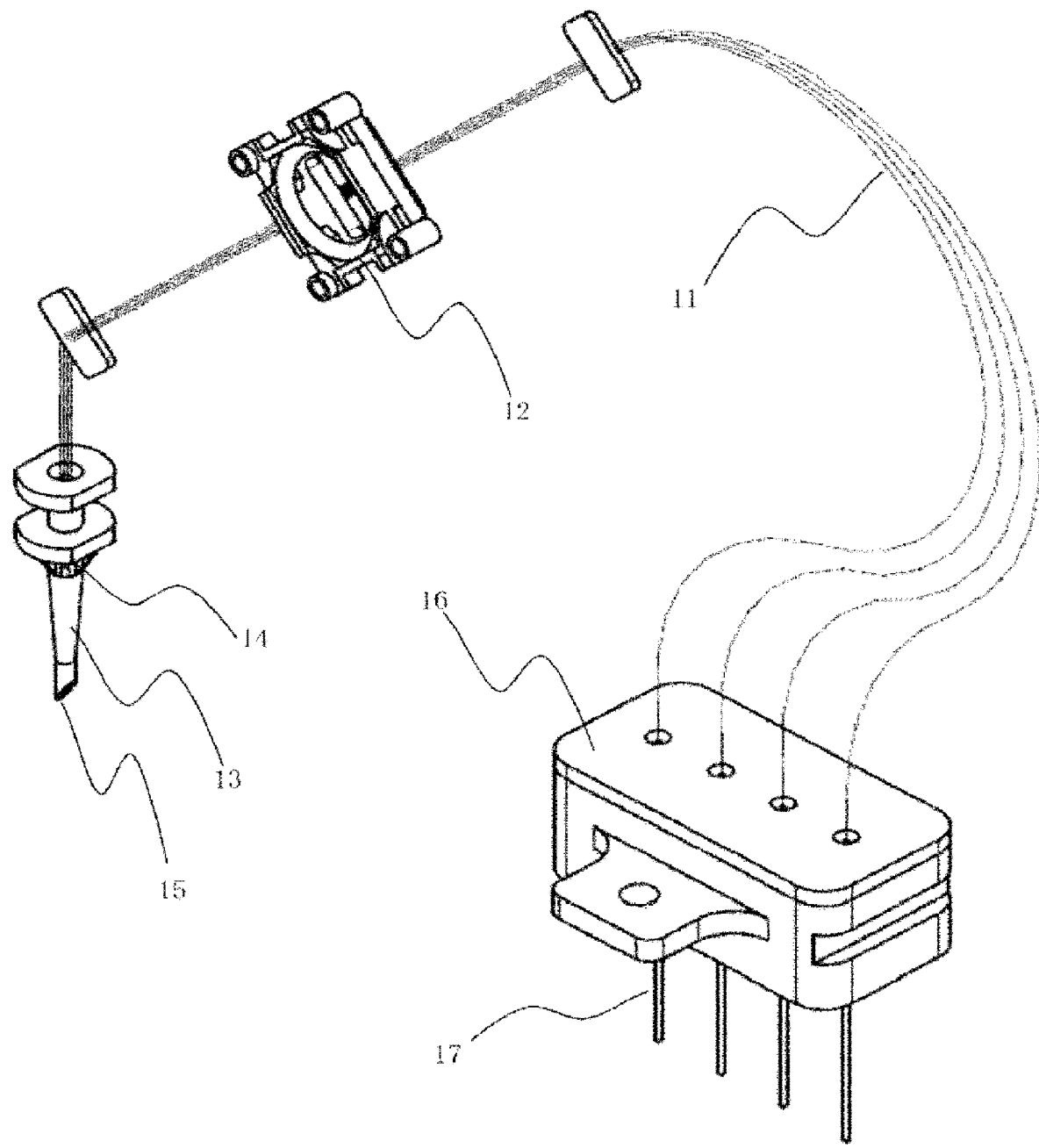

[Fig. 6]
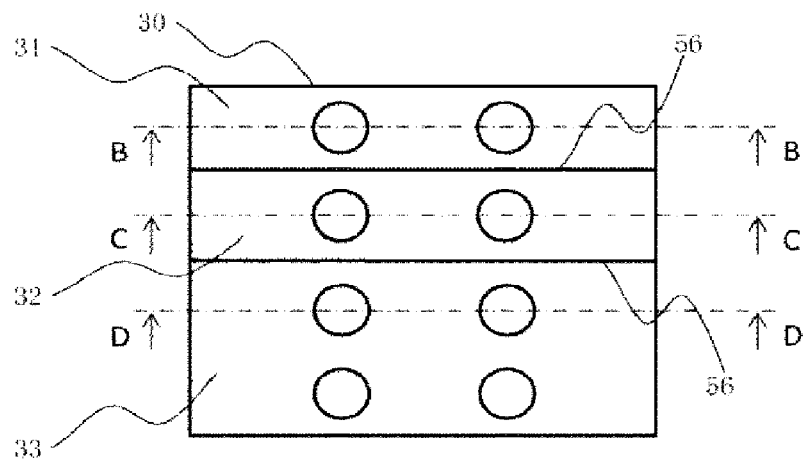
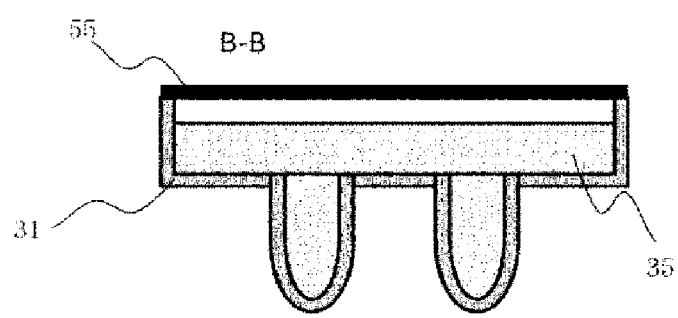
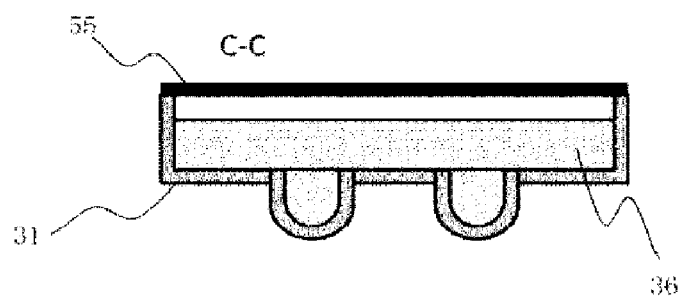
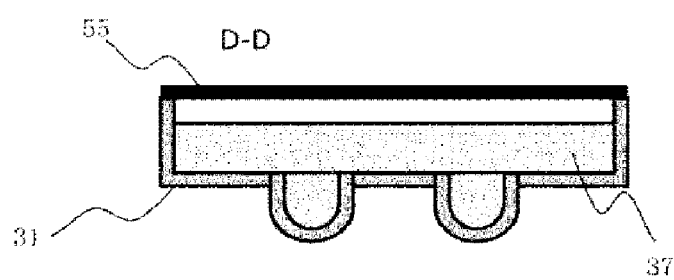

[Fig. 7]
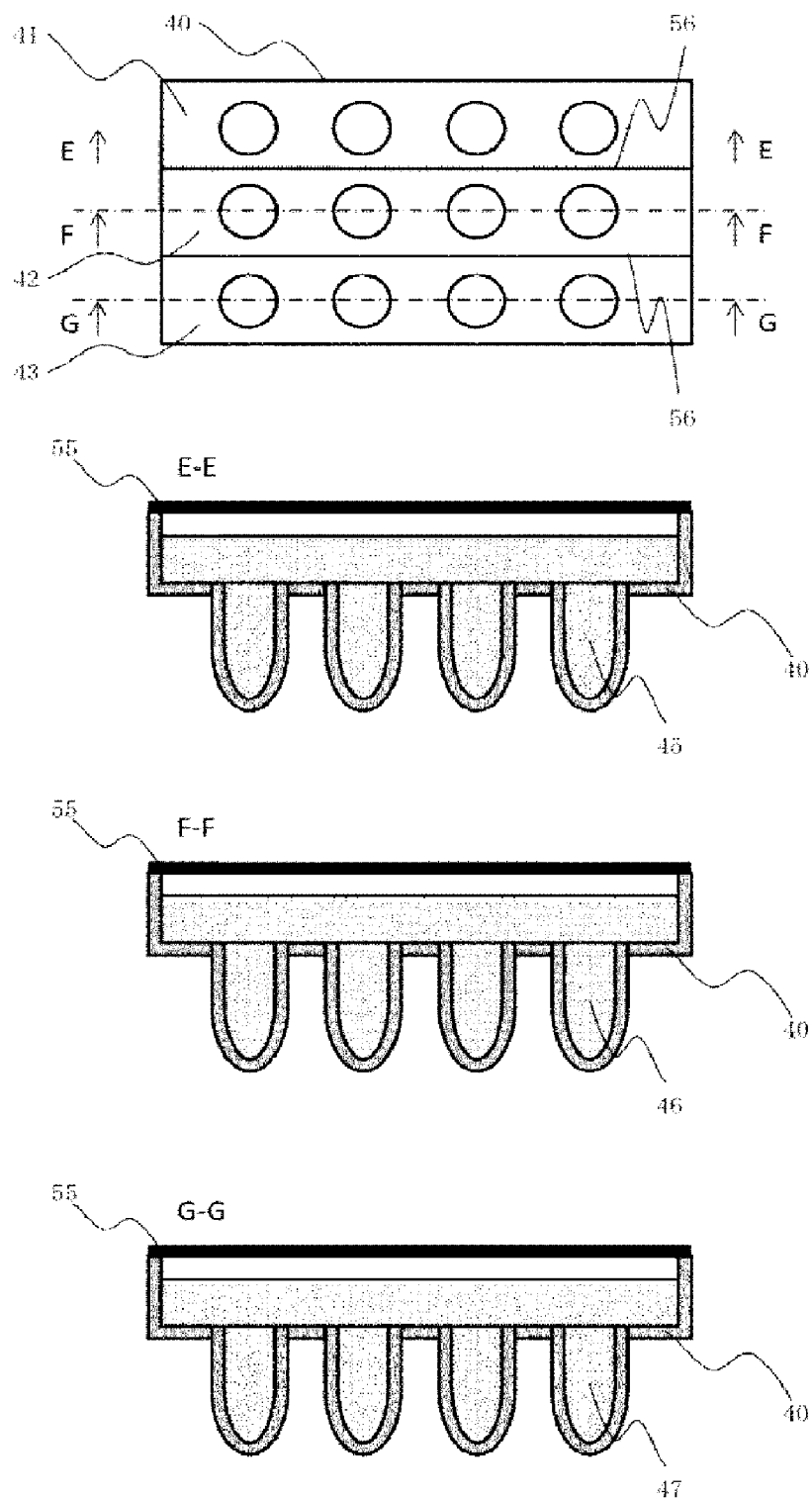

[Fig. 8]
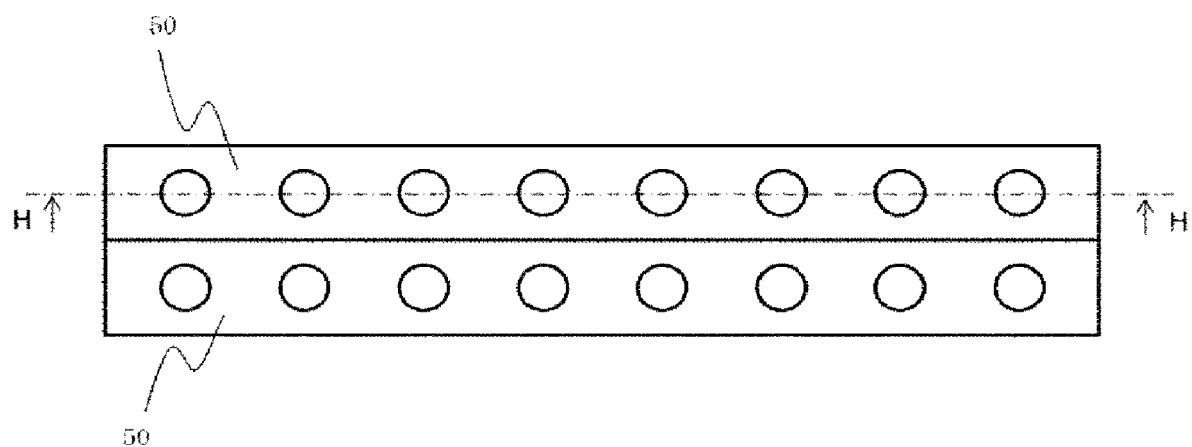
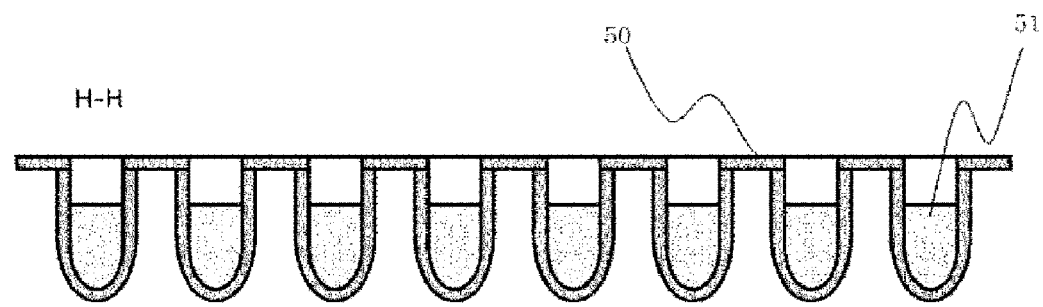

[Fig. 9]
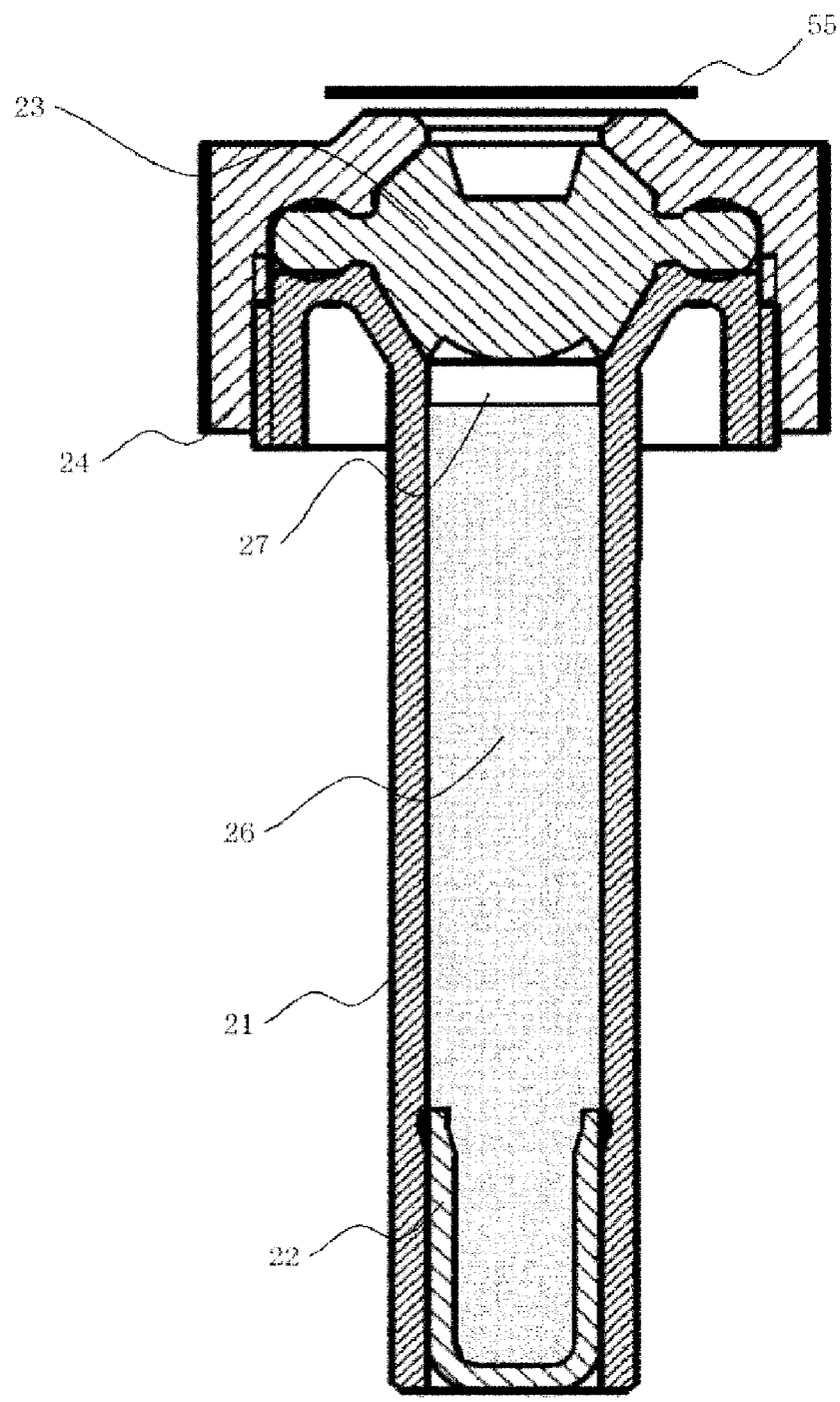

[Fig. 10]
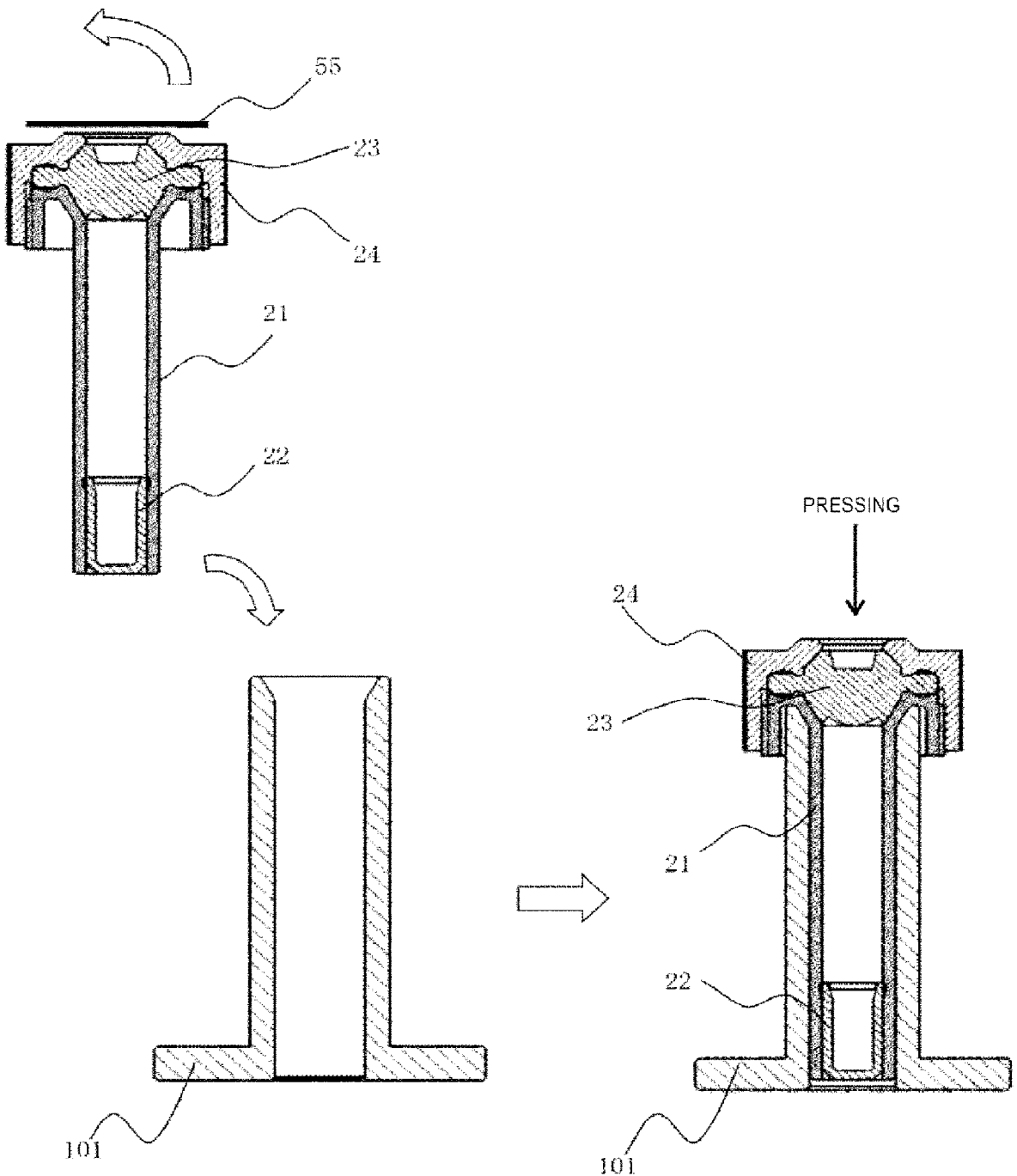

[Fig. 11]
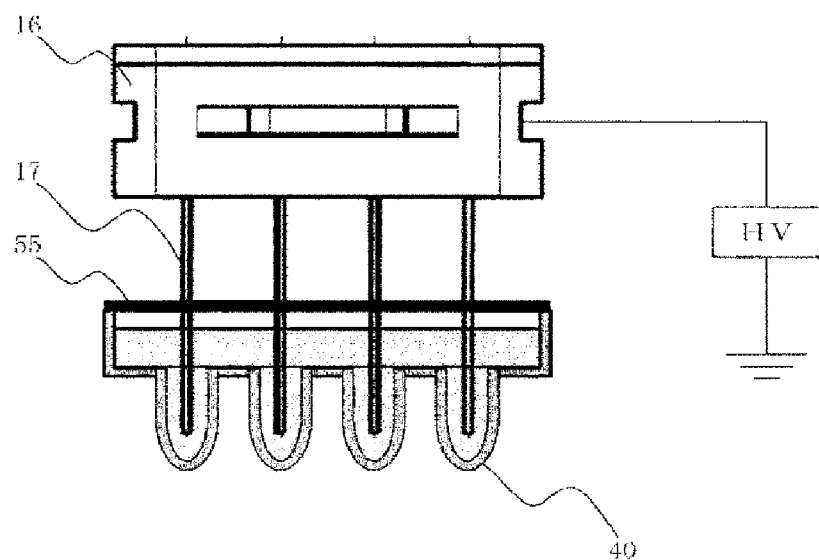
[Fig. 12]
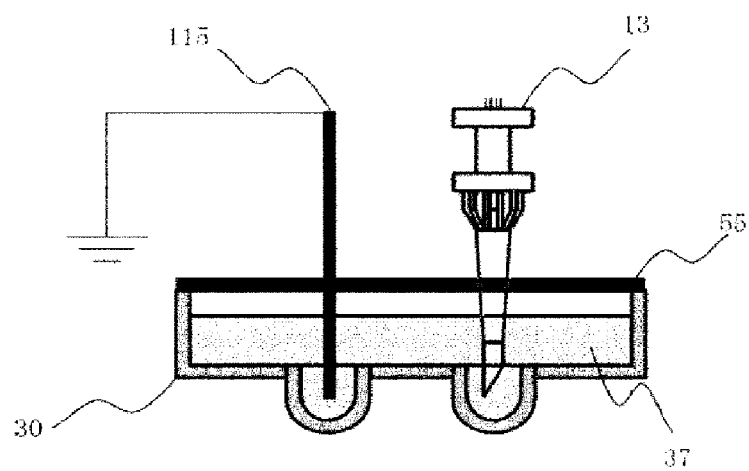

[Fig. 13]
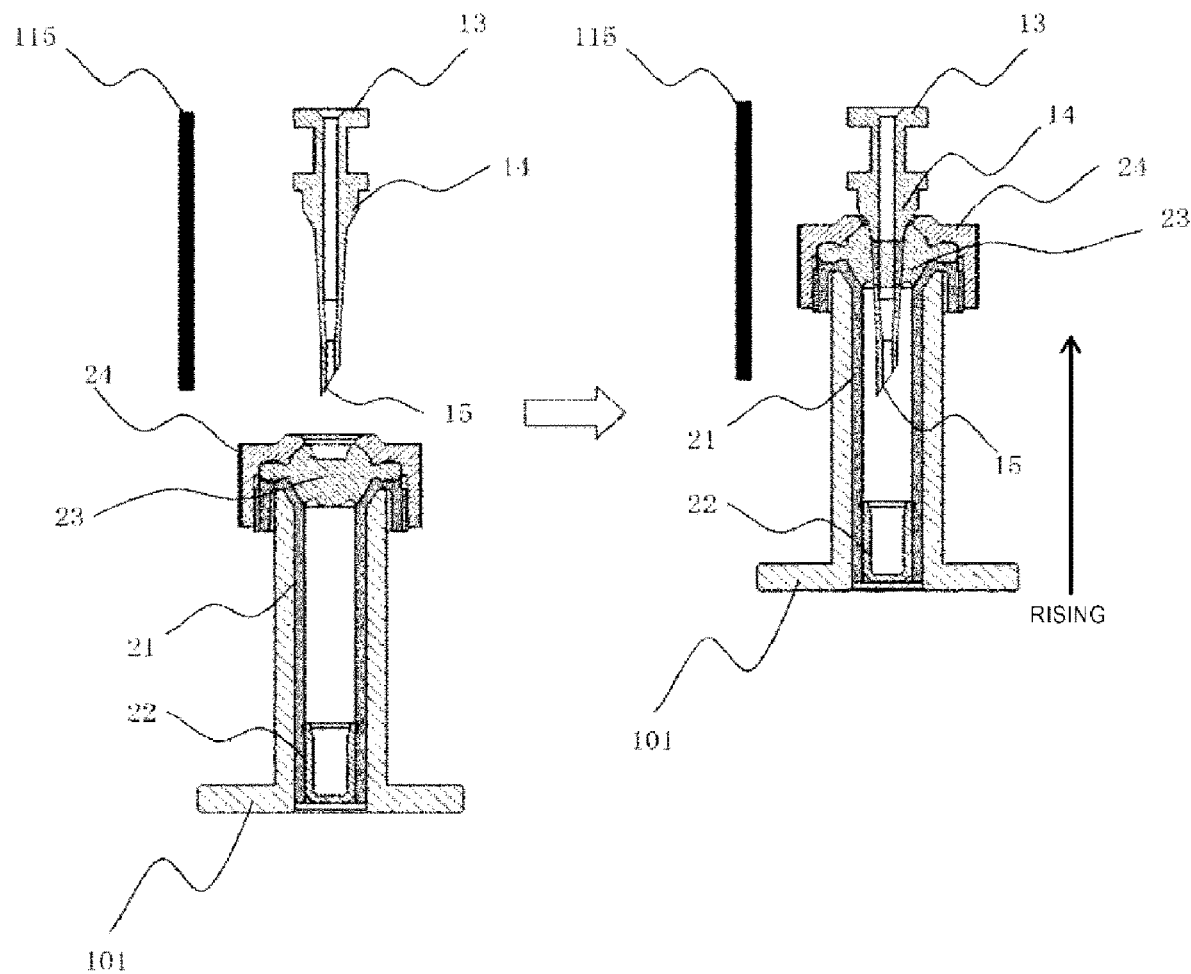

[Fig. 14]
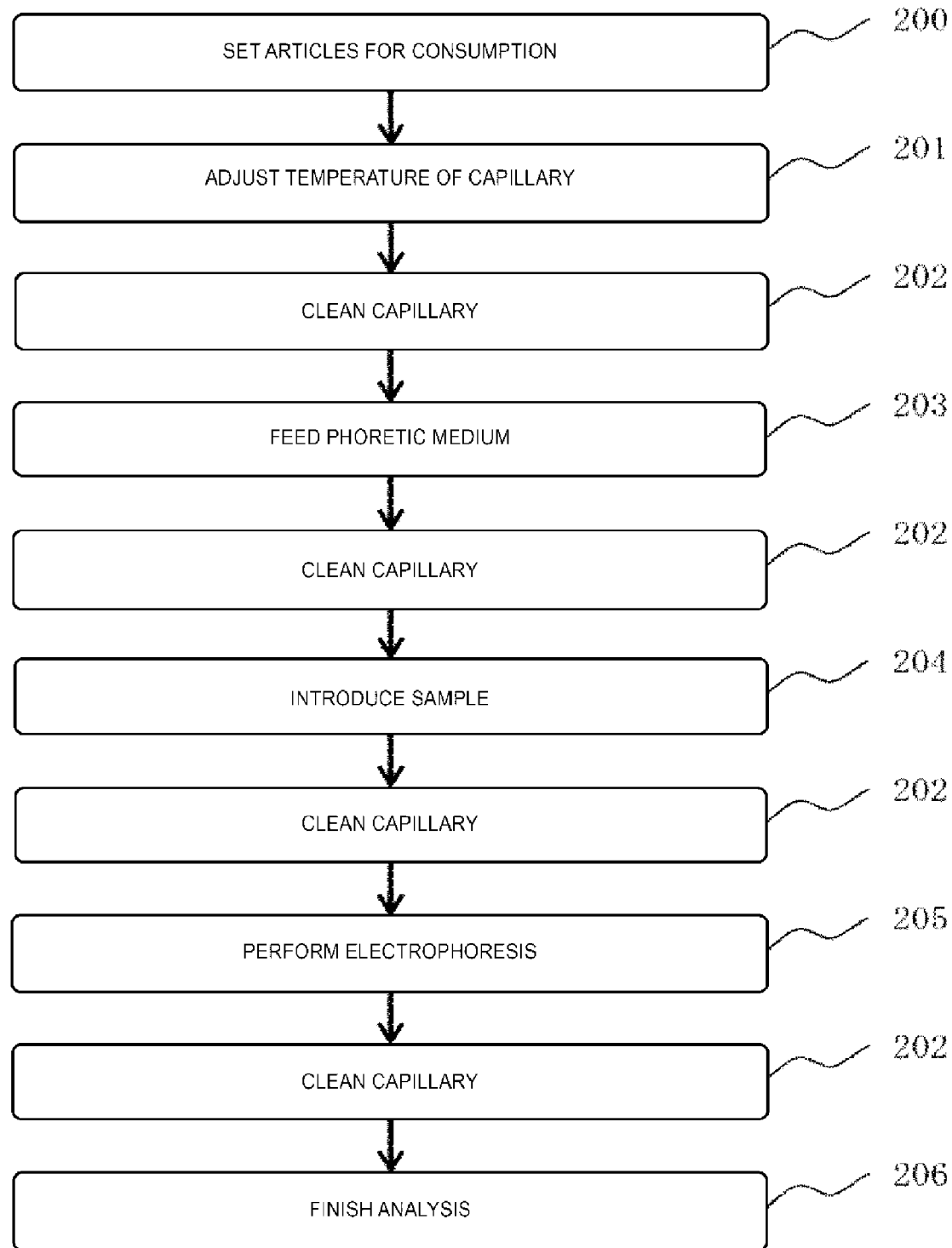

[Fig. 15]
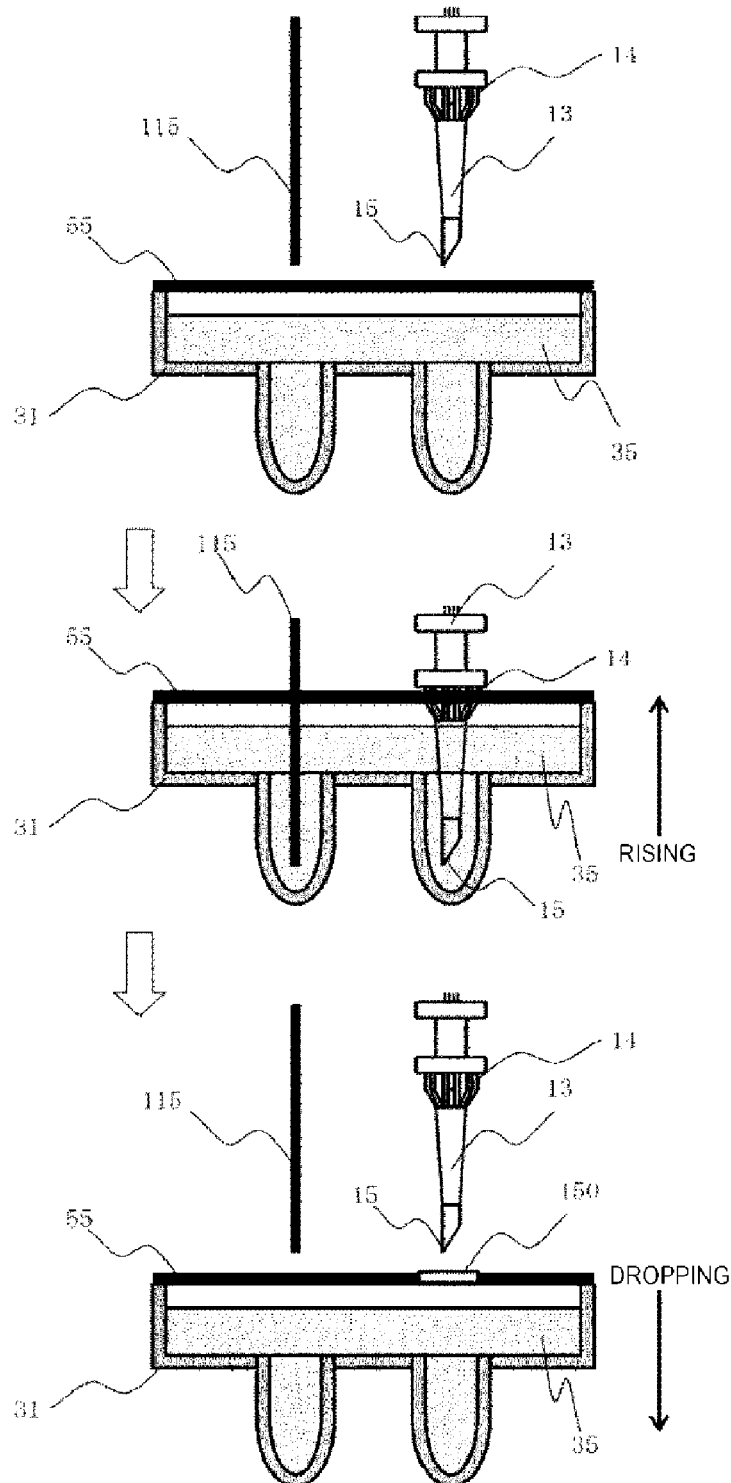

[Fig. 16]
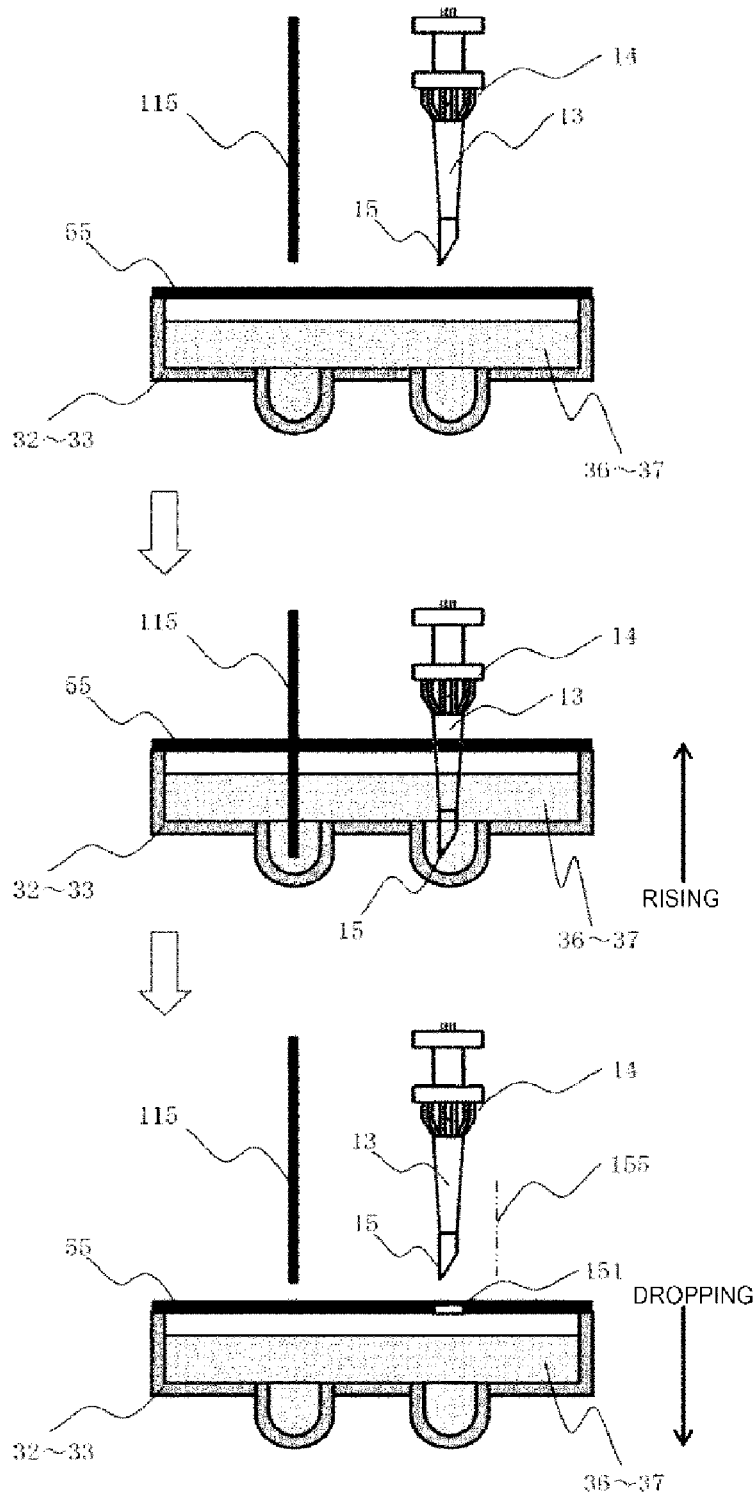

[Fig. 17]
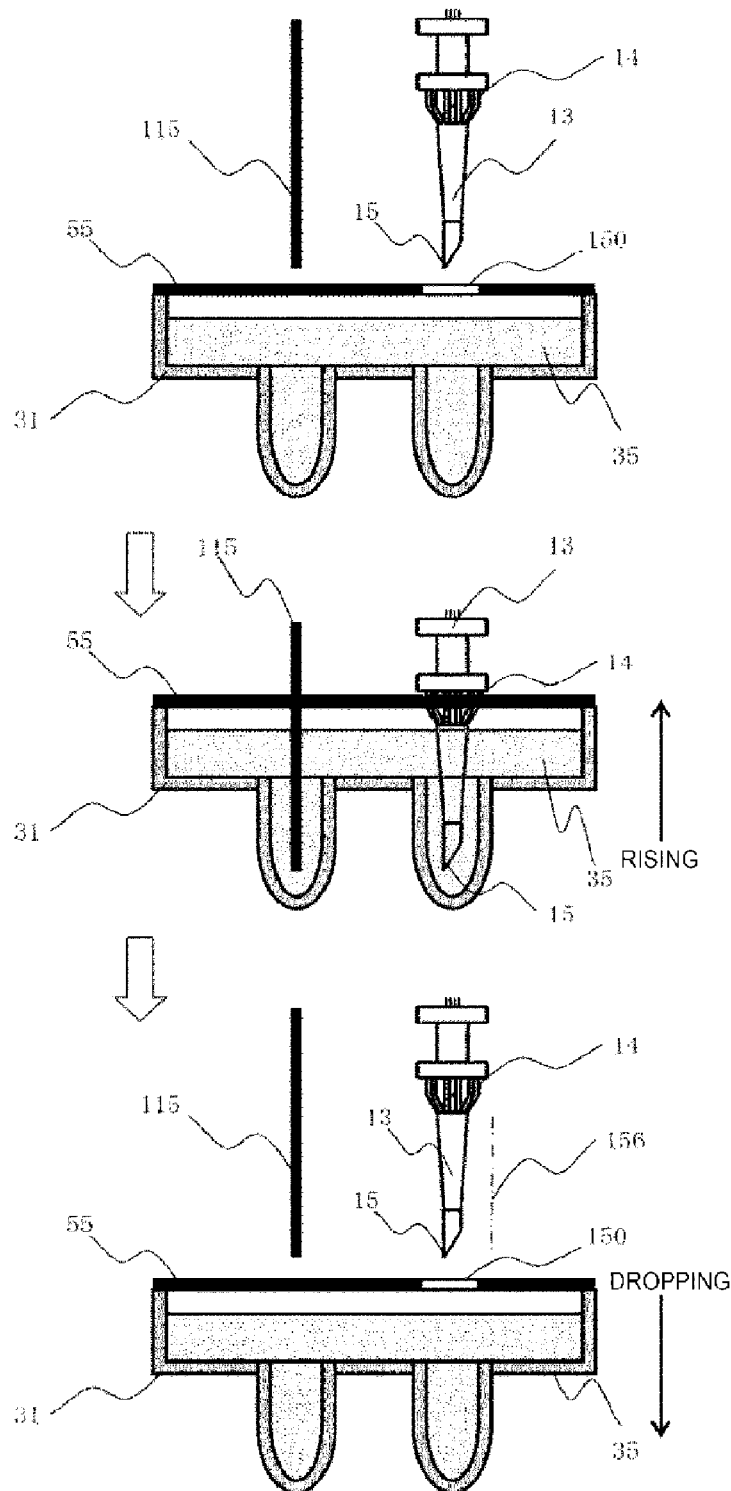

[Fig. 18]
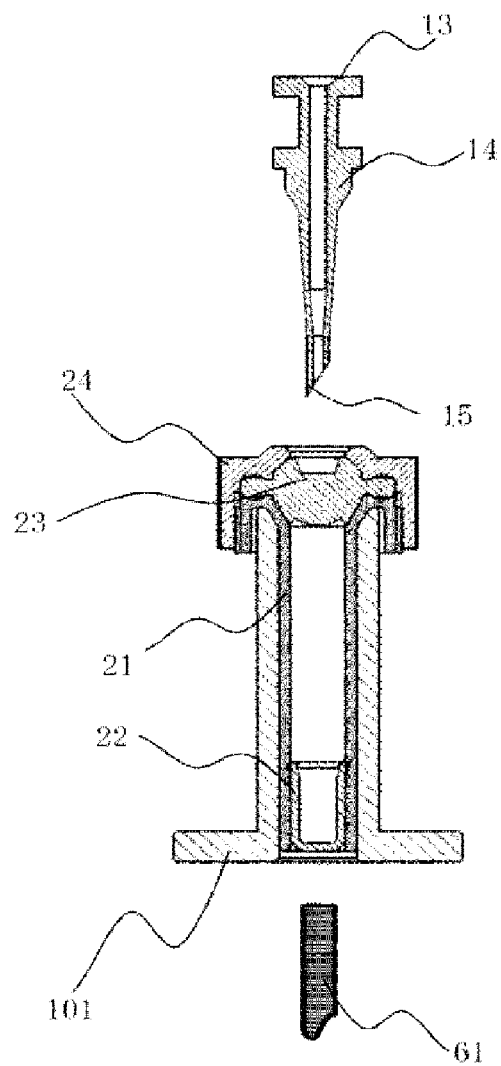

[Fig. 19]
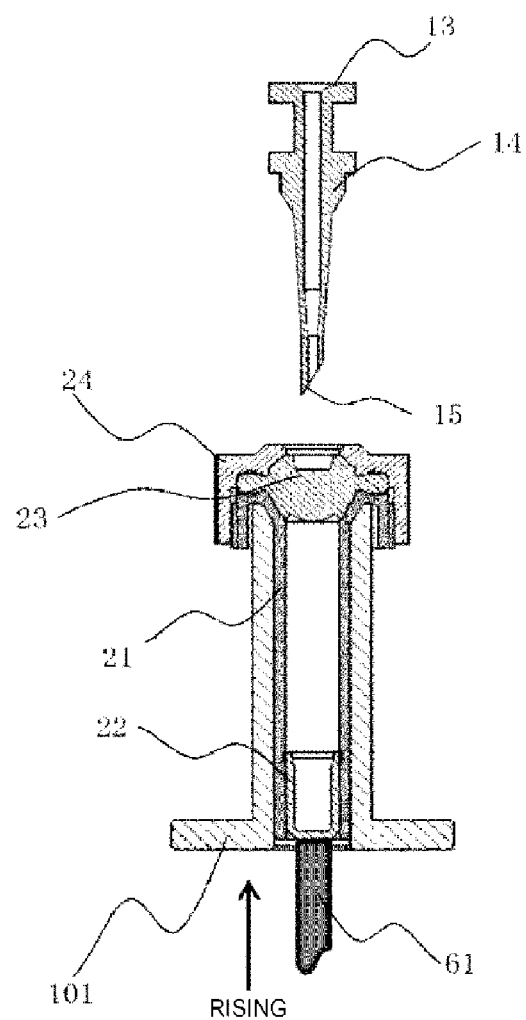

[Fig. 20]
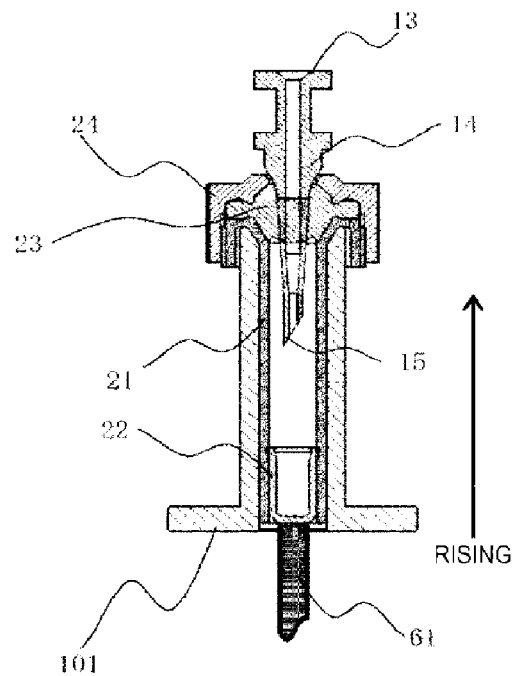
[Fig. 21]
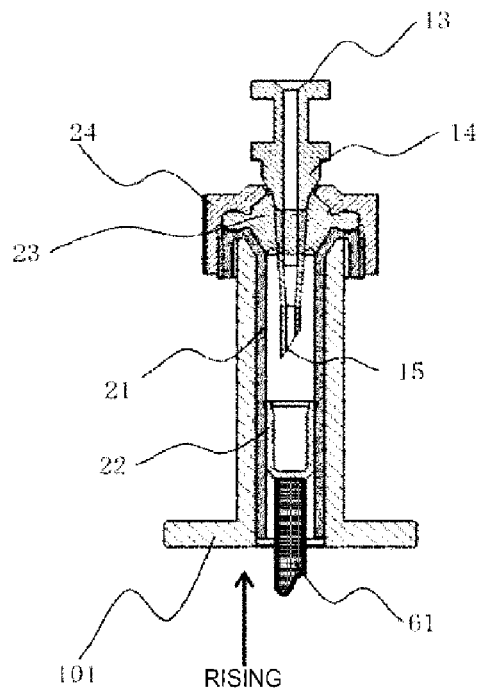

[Fig. 22]
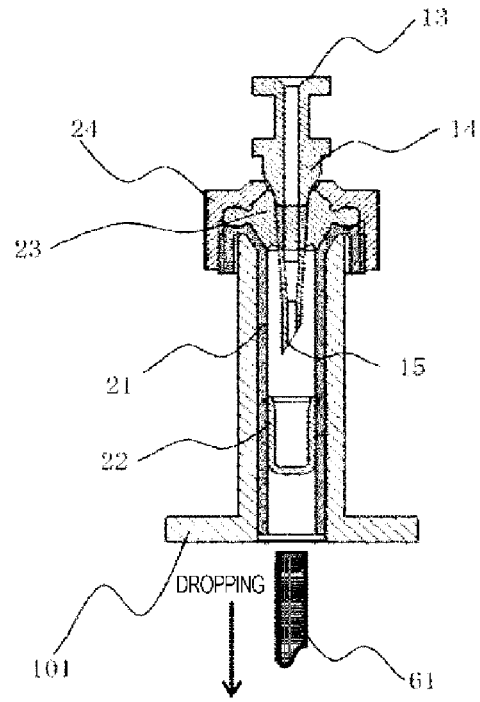
[Fig. 23]
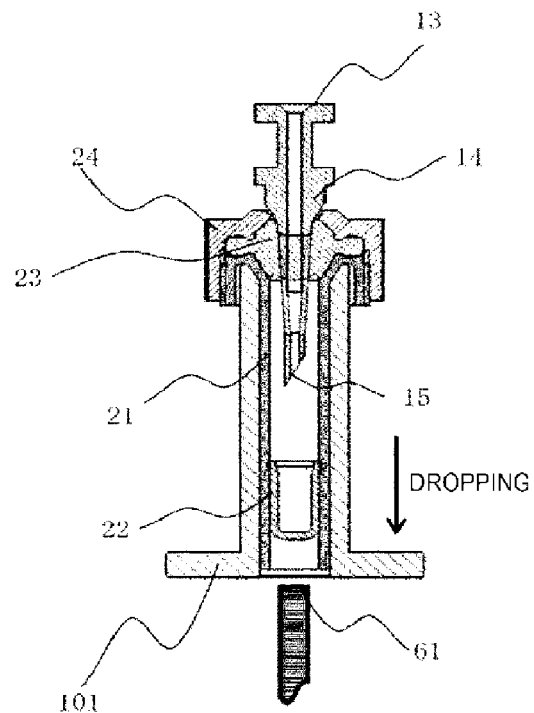

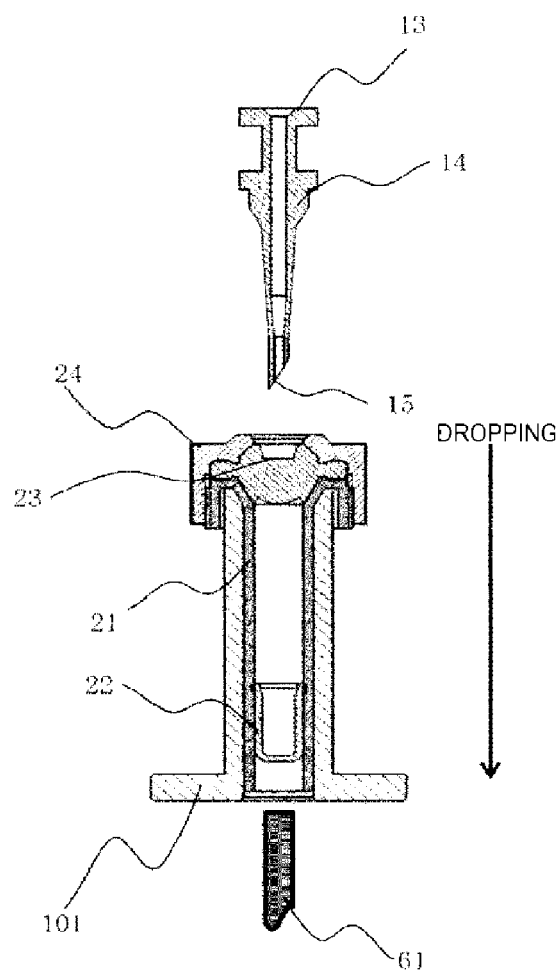
[Fig. 24]

[Fig. 25]
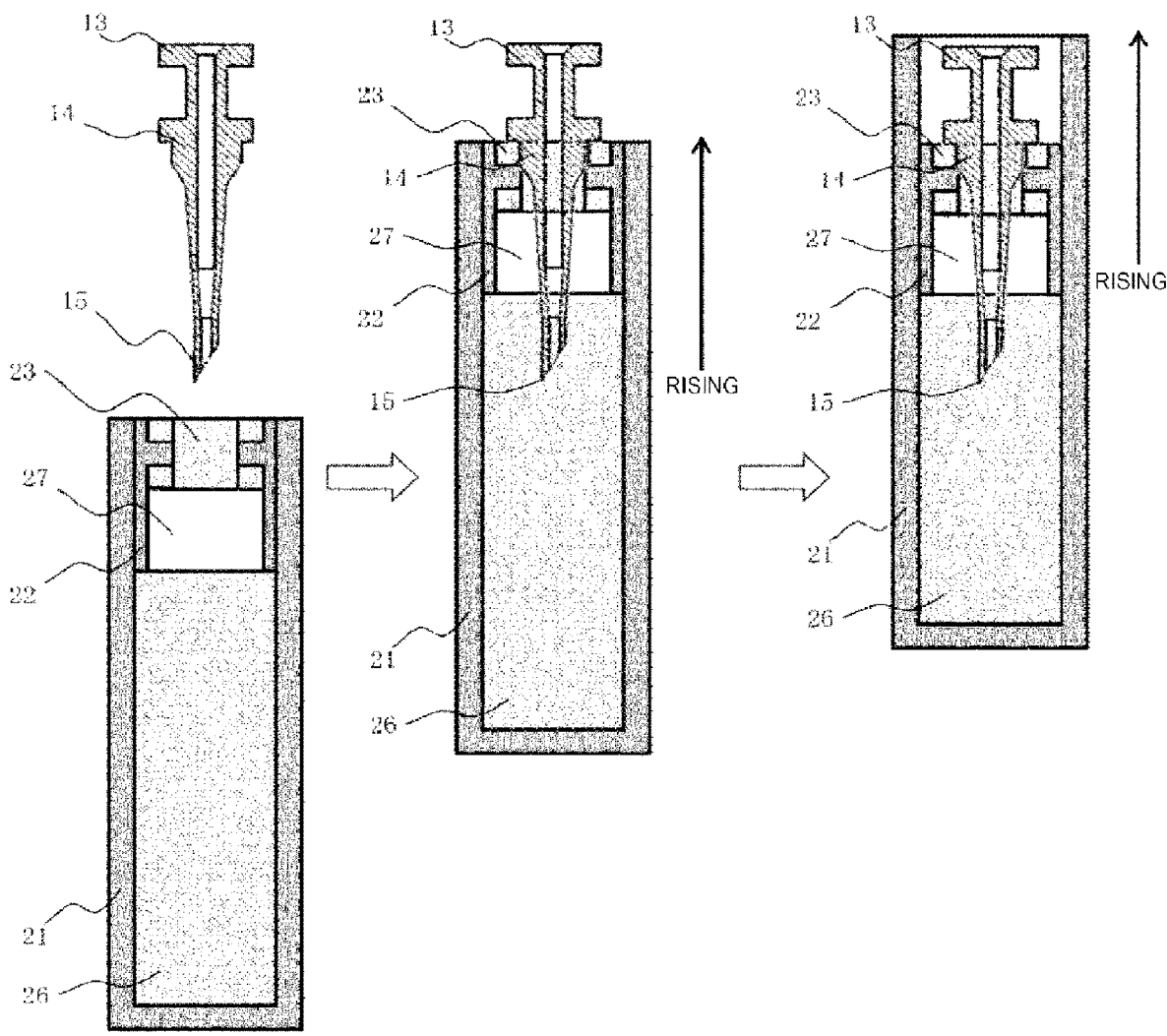

[Fig. 26]
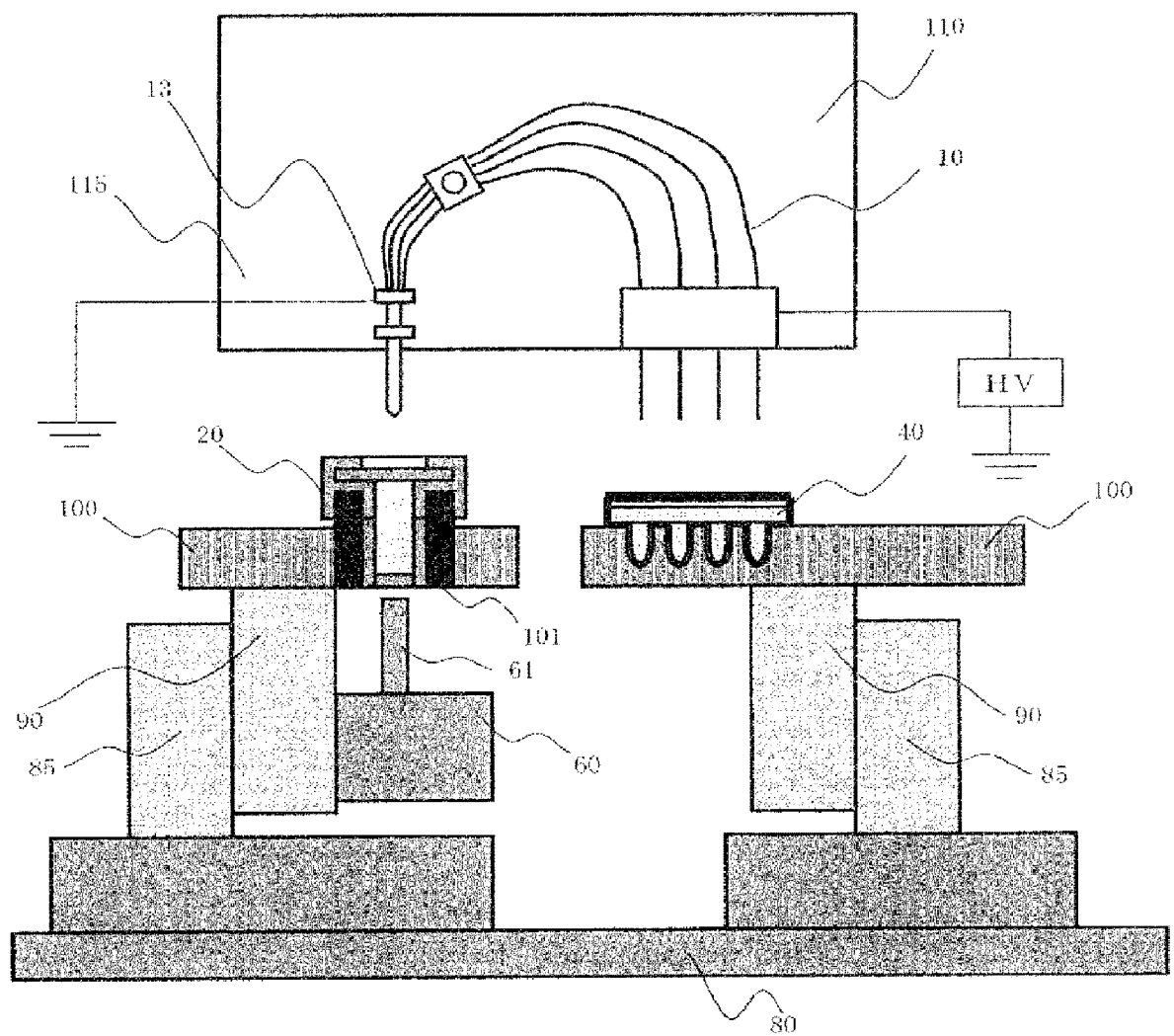

ELECTROPHORESIS DEVICE AND ELECTROPHORESIS METHOD

CROSS REFERENCE TO RELATED APPLICATIONS

This application is a divisional of U.S. patent application Ser. No. 15/560,395, filed Sep. 21, 2017, which is a U.S. National Stage of Application No. PCT/JP2015/059532, filed Mar. 27, 2015, the disclosures of all of which are expressly incorporated by reference herein.

TECHNICAL FIELD

The present invention relates to an electrophoresis device which performs separation analysis of nucleic acid, protein, and the like, and an electrophoresis method thereof.

BACKGROUND ART

Recently, as an electrophoresis device, a capillary electrophoresis device in which capillaries are filled with a phoretic medium such as polymer gel or polymer solution has been widely used.

For example, a capillary electrophoresis device as disclosed in PTL 1 has been used from the related art. Since the capillary electrophoresis device has higher heat-radiation properties than that of a flat plate type electrophoresis device, and a higher voltage can be applied to a sample, there is an advantage that electrophoresis is able to be performed at high speed. In addition, there are lots of advantages that, for example, a small amount of the sample is enough to complete an analysis, or automatic filling of the phoretic medium or sample automatic injection can be performed, and the capillary electrophoresis device is used for various separation analysis measurements as well as analysis of nucleic acid or protein.

In PTL 1, filling of the phoretic medium is performed using a syringe pump. There is a relay flow passage block having a function of the syringe pump, and filling is performed by connecting capillaries, sucking the phoretic medium using the syringe pump, and discharging the phoretic medium to the capillaries. In addition to the relay flow passage block, a buffer solution for performing electrophoresis is also connected, and the flow passage is switched by opening and closing a valve inside the relay flow passage block.

In the capillary electrophoresis device, the phoretic medium container or the capillaries are required to be replaced. However, at the time of replacing this component, since a part of the relay flow passage block is exposed to air, there is a possibility that air is mixed into the flow passage. At the time of performing the electrophoresis, a high voltage of several to several tens of kV is applied between both ends of the flow passage. Therefore, in a case in which bubbles are present inside the flow passage, there is a possibility that the flow passage is electrically blocked due to the bubbles. In a case in which the flow passage is electrically blocked, a high voltage difference occurs at the blocked part so as to cause electric discharge. According to magnitude of the electric discharge, there is a possibility that the capillary electrophoresis device is destroyed. Accordingly, before starting the electrophoresis, the bubbles need to be removed from the inside of the flow passage.

For example, in a case in which bubbles are present inside the flow passage of the relay flow passage block, a valve of the flow passage connected with the buffer solution is opened, and the phoretic medium is allowed to flow to the buffer solution side. Accordingly, the bubbles are removed from a section of flow passage inside the relay flow passage block. Meanwhile, in a case in which the bubbles are present in the flow passage of the capillaries, the inside of the capillaries are filled with the phoretic medium in an amount approximately twice with respect to a volume inside the capillaries. At this time, an inner diameter of each of the capillaries is as thin as approximately 50 µm. Therefore, the bubbles flow inside the capillaries with the phoretic medium, and are discharged from the other end of the capillaries. That is, the bubbles can be removed from the insides of the capillaries.

Filling of the phoretic medium to the capillaries can be performed by the same method as that of the related art. However, in a filling method of the phoretic medium, the extra phoretic medium is required to remove bubbles, such that the extra thereof becomes wasted. In a case in which analysis is performed many times at once, since the bubbles are removed only once, an amount of the wasted phoretic medium is small, but in a case in which the analysis is performed for less times at once, the bubbles are required to be removed whenever the capillaries or the phoretic medium are connected, and the amount of the wasted phoretic medium per the number of analyses increases. Since the phoretic medium is expensive, the amount of the wasted phoretic medium increases, and thus running costs thereof increase. In addition, if the electrophoresis is performed in a state in which the bubbles are remained, there is a possibility that the relay flow passage block is damaged. In this case, a damaged part is required to be repaired, and thus it takes a lot of time until restarting the inspection. Therefore, a user needs to check the presence and absence of the bubbles.

PTL 2 illustrates a structure in which bubbles in a relay flow passage block are not required to be visually checked and a difficulty of operating an electrophoresis device is reduced. Specifically, a phoretic medium container is set to a disposable phoretic medium container provided with a liquid feeding mechanism, and capillaries and flow passages of a phoretic medium and a buffer solution are switched in a detachable manner. Only in a case in which the phoretic medium is filled, the phoretic medium container and the capillaries are connected, at the time of performing the electrophoresis, the capillaries are detached from the phoretic medium container, and both ends of each of the capillaries are directly soaked into the buffer solution. That is, the relay flow passage block itself is not needed. Accordingly, the amount of the wasted phoretic medium for removing the bubbles is reduced, a flow passage having a risk of mixing of bubbles at the time of performing the electrophoresis can be removed, and thus the previous visual checking of bubbles by the user before performing the electrophoresis can be omitted. Even if the electrophoresis is performed in a state in which the bubbles are remained inside the flow passage, the damaged part can be limited to the capillaries. Also, since the capillaries are articles of consumption, it does not need to be repaired like the relay flow passage block. That is, the inspection can be restarted only by replacing the capillaries. Therefore, the time required until restarting the inspection can be significantly shortened.

CITATION LIST

Patent Literature

PTL 1: JP-A-2008-8621
PTL 2: Japanese Patent No. 5391350

SUMMARY OF INVENTION

Technical Problem

As a method in which a liquid feeding mechanism is included in a phoretic medium container as disclosed in PTL 2, for example, there is a method in which a syringe structure such as a syringe is set to the phoretic medium container and a capillaries are directly connected to the phoretic medium container. In order to allow the method to be practically used, the phoretic medium container is required to be made of an inexpensive resin molded article. Even when the amount of the wasted phoretic medium is reduced, the phoretic medium container becomes expensive, and thus the running costs thereof cannot be reduced. However, in the method of PTL 2, due to an influence of a liquid feeding pressure of the phoretic medium to the capillaries, stiffness of the phoretic medium container has to increase. If the stiffness of the phoretic medium container increases, the container is difficult to be made of the resin molded article, and costs of the phoretic medium container increase.

In addition, in order for the liquid feeding mechanism to be included in the phoretic medium container, and to detachably connect with the capillaries, apart connected with the capillaries and a part of the liquid feeding mechanism are necessary to have high pressure resistance. Since the inner diameter of the capillaries are approximately φ50 μm and the phoretic medium having several hundred times higher viscosity than water is injected, it is necessary to apply a pressure of several MPa thereto.

Further, the remaining amount inside the phoretic medium container is checked, and the amount of liquid feeding is needed to be managed in more detail same as that of the related art with resolution performance. If the resolution performance for managing the amount of liquid feeding is crude, the amount of liquid feeding for determining that the inside of the capillaries can be filled with the phoretic medium increases. In this way, the phoretic medium for removing the bubbles is not needed, but the amount of the phoretic medium for filling the capillaries increases, and as a result, the required amount of the phoretic medium increases. Accordingly, the running costs cannot be reduced.

In order to solve the above-described problems, it is necessary to suppress the expansion of the phoretic medium container due to the liquid feeding pressure, with the inexpensive phoretic medium container as it is. An object of the invention is to provide a capillary electrophoresis device in which the problems described above are solved.

Solution to Problem

According to the invention, there is provided an electrophoresis device which feeds a sample into capillaries by electrophoresis and optically detects the sample, the device including capillaries, a capillary head that is provided at a distal end of the capillaries, a phoretic medium-filled container that is used for the electrophoresis and filled with a phoretic medium, a guide member that covers a side surface of the phoretic medium-filled container, a seal member that seals the phoretic medium filled in the phoretic medium-filled container from below, and a plunger that presses the seal member.

Advantageous Effects of Invention

According to the invention, in order to suppress the expansion of the phoretic medium container, a container having high pressure resistance can be used. In addition, the container can be realized as a phoretic medium container having a function of feeding of inexpensive liquid. Accordingly, both of reduction in running costs and improvement in workability of the user can be realized.

BRIEF DESCRIPTION OF DRAWINGS

FIG. 1 is a schematic view of a configuration of a device of the invention.
FIG. 2 is a top view of the device of the invention.
FIG. 3 is a sectional view of a device taken along A-A line.
FIG. 4 is a detailed view of a liquid feeding mechanism.
FIG. 5 is a detailed view of a capillary array.
FIG. 6 is a detailed view of an anode side buffer solution container.
FIG. 7 is a detailed view of a cathode side buffer solution.
FIG. 8 is a detailed view of a sample container.
FIG. 9 is a detailed view of a phoretic medium container.
FIG. 10 is a detailed view of installation of the phoretic medium container.
FIG. 11 is a view of a connection state of the capillary array and a cathode side buffer solution container.
FIG. 12 is a view of a connection state of the capillary array and the anode side buffer solution container.
FIG. 13 is a view of a connection state of the capillary array and the phoretic medium container.
FIG. 14 is a workflow of analysis according to this example.
FIG. 15 is a detailed view of a cleaning operation of a capillary head (initial cleaning).
FIG. 16 is a detailed view of a cleaning operation of the capillary head (buffer solution contacting liquid).
FIG. 17 is a detailed view of a cleaning operation of the capillary head (buffer solution cleaning).
FIG. 18 is a detailed view of a liquid feeding operation of a phoretic medium (initial state).
FIG. 19 is a detailed view of a liquid feeding operation of the phoretic medium (plunger contact detection).
FIG. 20 is a detailed view of a liquid feeding operation of the phoretic medium (capillary connection).
FIG. 21 is a detailed view of a liquid feeding operation of the phoretic medium (phoretic medium injection).
FIG. 22 is a detailed view of a liquid feeding operation of the phoretic medium (plunger contact release).
FIG. 23 is a detailed view of a liquid feeding operation of the phoretic medium (residual pressure removing).
FIG. 24 is a detailed view of a liquid feeding operation of the phoretic medium (capillary connection release).
FIG. 25 is a detailed view of a phoretic medium container according to the example.
FIG. 26 is a sectional view taken along A-A line according to the example.

DESCRIPTION OF EMBODIMENTS

In order to suppress the expansion of a phoretic medium container, a structure is produced in which the expansion on a device side where a container is set is suppressed without increasing stiffness of the phoretic medium container itself. In addition, a fluid sealed part inside the phoretic medium container has an inner pressure sealing structure which becomes more sealed when the inner pressure increases. Accordingly, even when an inexpensive phoretic medium container is used as it is, the expansion thereof is suppressed, and it is possible to maintain a high pressure resistance. Further, a function of detecting the remaining amount in the device side of the phoretic medium container, and a function capable of removing an inner pressure inside the phoretic medium container after feeding liquid are provided. Accordingly, the remaining amount inside the phoretic medium container and an amount of feeding liquid can be managed.

Hereinafter, a specific structure will be described.

The phoretic medium container has a syringe structure like a syringe, and a guide component for suppressing expansion of the container itself is set therein. The guide component has high stiffness, and when the phoretic medium container expands, the container expands until coming into contact with the guide component, but further expansion thereof is suppressed.

The phoretic medium container and capillaries are in contact with each other by tying a plurality of the capillaries together, providing a capillary head in which a distal end is sharpened like a needle shape, providing a rubber stopper in the phoretic medium container, and making the rubber stopper penetrate through the capillary head. At this time, the rubber stopper presses the capillary head, such that expansion of the rubber stopper due to a liquid feeding pressure in the capillary head is suppressed.

In the phoretic medium container of a syringe structure, a seal component which can be operated to feed liquid is embedded. A seal surface of the seal component has a shape and a thickness so as to be easily deformed due to an inner presser further than a container syringe. In addition, the seal component is a recessed shape inward the container, a distal end in a recessed shape is set to a seal surface, and thus an inner pressure seal structure which is more sealed is provided when the inner pressure increases.

The phoretic medium is fed by pressing the seal component of the phoretic medium container from the outside. A liquid feeding mechanism, which is provided with a plunger pressing the seal component, is provided with an encoder so as to detect a speed change in a case in which the plunger is in contact with the seal component. In addition, after the liquid feeding, since a pressure of an inner portion of the phoretic medium container increases, a force of returning the seal component to its original position is activated. The plunger which is in contact with the seal component in this state is separated once. Accordingly, the seal component is moved in a direction of the original position, and the inner pressure of the phoretic medium container is removed.

According to the invention, in order to suppress the expansion of the phoretic medium container, a high pressure resistance container can be used. Further, when a position of the seal component inside the phoretic medium container is detected, and the remaining voltage inside the phoretic medium container is removed, the remaining amount and the amount of liquid being fed inside the phoretic medium container can be managed. In addition, the above description can be realized as an inexpensive phoretic medium container having a liquid feeding function. Accordingly, both reduction of a running cost and improvement of workability of a user can be realized.

Example 1

Hereinafter, a configuration and arrangement of a device, a main component structure, and an installation method of the invention will be described with reference to FIG. 1 to FIG. 10.

FIG. 1 is a view of a configuration of a capillary electrophoresis device to which the invention is applied. The device can be mainly divided into two units of an auto-sampler unit 150 on a lower portion of the device and an irradiation detecting and constant-temperature bath 160 on an upper portion of the device.

In the auto-sampler unit 150, a Y axis driving member 85 is mounted on a sampler base 80, and driving in a Y axis can be performed. In the Y axis driving member 85, a Z axis driving member 90 is mounted, and driving in a Z axis can be performed. A sample tray 100 is mounted on the Z axis driving member 90, and a user sets a phoretic medium container 20, an anode side buffer solution container 30, a cathode side buffer solution container 40, and a sample container 50 on the sample tray 100. The sample container 50 is set on an X axis driving member 95 which is mounted on the sample tray 100, and only the sample container 50 on the sample tray 100 can be driven in an X axis. The liquid feeding mechanism 60 is also provided in the Z axis driving member 90. The liquid feeding mechanism 60 is disposed under the phoretic medium container 20.

The constant-temperature bath 110 and a constant-temperature bath door 120 are provided in the irradiation detecting and constant-temperature bath 160, and a temperature inside the bath can be constantly maintained. An irradiation detecting unit 130 is mounted on a rear side of the constant-temperature bath 110, such that detection at the time of electrophoresis can be performed. The user sets the capillary array 10 in the constant-temperature bath 110, the electrophoresis is performed while the capillary array 10 is maintained at a constant temperature in the constant-temperature bath 110, and the irradiation detecting unit 130 performs detection. In addition, an electrode 115, which is for dropping a voltage to GND at the time of applying a high voltage for performing the electrophoresis, is also mounted in the constant-temperature bath 110.

As described above, the capillary array 10 is fixed to the constant-temperature bath 110. The phoretic medium container 20, the anode side buffer solution container 30, the cathode side buffer solution container 40, and the sample container 50 can be driven in a YZ axis by the auto-sampler unit 150, and only the sample container 50 can be further driven in the X axis. With the fixed capillary array 10, the phoretic medium container 20, the anode side buffer solution container 30, the cathode side buffer solution container 40, and the sample container 50 can be automatically connected to an arbitrary position due to movement of the auto-sampler unit 150.

FIG. 2 is a view of the capillary electrophoresis device when seen from the top. An anode side cleaning layer 31, a buffer solution layer for anode side electrophoresis 32, and a buffer solution layer for sample introduction 33 are provided in the anode side buffer solution container 30 set on the sample tray 100. In addition, a waste liquid layer 41, a cathode side cleaning layer 42, and a buffer solution layer for cathode side electrophoresis 43 are provided in the cathode side buffer solution container 40.

The phoretic medium container 20, the anode side buffer solution container 30, the cathode side buffer solution container 40, and the sample container 50 are disposed with a positional relationship as illustrated in drawings. Accordingly, a positional relationship between the anode side and the cathode side at the time of connecting to the capillary array 10 becomes a positional relationship of "the phoretic medium container 20 and the waste liquid layer 41", "the anode side cleaning layer 31 and the cathode side cleaning layer 42", "the buffer solution layer for anode side electrophoresis 32 and the buffer solution layer for cathode side electrophoresis 43", and "the buffer solution layer for sample introduction 33 and the sample container 50".

FIG. 3 illustrates a sectional view taken along A-A line of FIG. 2. The phoretic medium container 20 is set to be inserted into a guide 101 which is embedded in the sample tray 100. In addition, the liquid feeding mechanism 60 is disposed so that a plunger 61 embedded in the liquid feeding mechanism 60 is positioned under the phoretic medium container 20.

At the time of the electrophoresis, the right side in FIG. 3 of the capillary array 10 is set as a cathode side, and the left side thereof is set as an anode side. The auto-sampler unit 150 is moved to a position relating to the positional relationship of "the buffer solution layer for anode side electrophoresis 32 and the buffer solution layer for cathode side electrophoresis 43", and a high voltage is applied to the capillary array 10 of the cathode side and flows to GND to the electrode 115 through the cathode side buffer solution container 40 and the anode side buffer solution container 30, such that the electrophoresis is performed.

FIG. 4 illustrates a detailed view of the liquid feeding mechanism 60. A stepping motor 62 attached to a rotary encoder 63 is mounted on a liquid feeding mechanism base 70, and a driving pulley 67 is attached to the stepping motor 62. For example, the stepping motor 62 is a two-phase stepping motor, and the rotary encoder 63 is capable of performing 400 counts per one rotation. A driving pulley 67 and a driven pulley 68 are connected by a belt 69, and the driven pulley 68 and a ball screw 65 are fixed. A linear guide 66 is attached to the liquid feeding mechanism base 70 in parallel to the ball screw 65, and the linear guide 66 and the ball screw 65 are fixed by the slider 71. A detection plate 72 is attached to the slider 71, and an origin point is detected by shielding an origin sensor 64 using the detection plate 72. In addition, the plunger 61 is attached to the slider 71 in an axis direction same as that of a driving axis. Accordingly, the plunger 61 can be driven by rotating the stepping motor 62.

FIG. 5 is a detailed view of the capillary array 10. Capillaries 11 which are glass tubes having approximately φ50 μm of an inner diameter are provided in the capillary array 10, and a detecting unit 12 is attached to the capillaries 11. The irradiation detecting unit 130 detects the detecting unit 12. A load header 16 and SUS pipes 17 are attached to end portions of the cathode sides of the capillaries 11. As a material of the load header 16, for example, a PBT resin or the like is desirable which is a resin having a high insulating property and a high comparison tracking index. A component which attains conducting of all of the SUS pipes 17 is embedded in the load header 16, and a high voltage is applied to all the SUS pipes 17 by applying the high voltage to the component. Each of the capillaries 11 penetrates and is fixed to the SUS pipes 17. On the anode side, a plurality of the capillaries 11 are tied together by the capillary head 13. The capillary head 13 includes a capillary head distal end 15 which is a needle shape at an acute angle, and a capillary head boss 14 which is a part having a bigger outer diameter than that of the capillary head distal end 15. As a material of the capillary head 13, a PEEK resin or the like, which has stiffness so as to be hardly broken and is highly stable against chemicals and analysis, is desirable.

It is omitted in the drawings, but the detecting unit 12, the load header 16, and the capillary head 13 are respectively fixed, when the capillary array 10 is fixed to the constant-temperature bath 110. A position of the detecting unit 12 is determined with high accuracy so as to be detected by the irradiation detecting unit. The load header 16 is fixed so as to be conducted with a part to which a high voltage is applied at the time of being fixed. The capillary head 13 is positioned so that the capillary head distal end 15 is directly positioned under the capillary head, and is strongly fixed so as to withstand a load. Regarding the positional relationship of the cathode side and the anode side at the time of fixing, the plurality of capillaries 11 are disposed so as not to overlap with each other at the time of being set in a device.

FIG. 6 is a detailed view of the anode side buffer solution container 30. As described above, the anode side cleaning layer 31, the buffer solution layer for anode side electrophoresis 32, and the buffer solution layer for sample introduction 33 are provided in the anode side buffer solution container 30. One container is partitioned by a partition 56. As a material of the anode side buffer solution container 30, a PC resin or the like which is a transparent resin in order to be able to see the buffer solution therein is desirable. Sections of the anode side cleaning layer 31, the buffer solution layer for anode side electrophoresis 32, and the buffer solution layer for sample introduction 33 are respectively illustrated as a sectional view of B-B, a sectional view of C-C, and a sectional view of D-D. As illustrated in each sectional view, an upper surface of the anode side buffer solution container 30 is sealed with a film 55. As a material of the film 55, a material is used which is able to weld with a PC resin and to suppress water vapor permeation. In addition, a cleaning operation to be described later includes an expanding operation of a hole. When the expanding operation is considered, since the film 55 is required to be made with a material which is difficult to stretch, it is desirable that the film includes an aluminum layer. Among them, an anode side cleaning liquid 35, a buffer solution for anode side electrophoresis 36, and a buffer solution for sample introduction 37 are respectively enclosed. Respective liquid is enclosed in an amount with which the analysis can be performed 10 times. Since an upper portion of the partition 56 is also sealed with the film 55, reagents are not mixed with each other. In addition, the container bottom of the anode side cleaning layer 31 with respect to the buffer solution layer for anode side electrophoresis 32 and the buffer solution layer for sample introduction 33 is deep. It is omitted in the drawings, but when the anode side buffer solution container 30 is set in the device, the anode side buffer solution container is set in the device as it is without peeling off the film 55, and is locked so as not to be lifted.

FIG. 7 illustrates a detailed view of the cathode side buffer solution container 40. As described above, the waste liquid layer 41, the cathode side cleaning layer 42, and the buffer solution layer for cathode side electrophoresis 43 are provided in the cathode side buffer solution container 40. These components become one container, and it is partitioned by a partition 56. A material of the cathode side buffer solution container 40 is desirably a PC resin or the like, which is a transparent resin in order to be possible to see the buffer solution therein, same as the material of the anode side buffer solution container 30. Sections of the waste liquid layer 41, the cathode side cleaning layer 42, and the buffer solution layer for cathode side electrophoresis 43 are respectively illustrated as a sectional view of E-E, a sectional view of F-F, and a sectional view of G-G. As illustrated in each sectional view, an upper surface of the cathode side buffer solution container 40 is sealed with the film 55, same as the anode side buffer solution container 30. All layers have the same shape, and a waste liquid received liquid 45, a cathode side cleaning liquid 46, and a buffer solution for cathode side electrophoresis 47 are enclosed therein. Respective liquid is enclosed in an amount with which the analysis can be performed 10 times. Since the upper portion of the partition 56 is also sealed with the film 55 same as the anode side buffer solution container 30, reagents are not mixed with each other. It is omitted in the drawings, but when the cathode side buffer solution container 40 is set in the device, the cathode side buffer solution container is set in the device as it is without peeling the film 55, and locked so as not to be lifted.

FIG. 8 illustrates a detailed view of the sample container 50. A sectional view of H-H is set to a sectional view of the sample container 50, and a sample 51 is enclosed in the sample container. Since a user prepares the sample 51, the sample container 50 is preferably a container which is also easily handled in a pretreatment process or the like. In this device, the sample container 50 is for example, an Eppendorf's eight strips tube. It is omitted in the drawings, but when the sample container 50 is set in the device, the sample container is set in the device as it is.

FIG. 9 illustrates a detailed view of the phoretic medium container 20. In the phoretic medium container 20, a seal 22 of the recessed shape is embedded in the syringe 21, and the container is sealed with a cap 24 by putting a rubber stopper 23 from the top. An upper portion of the cap 24 is further sealed with the film 55. A material of the syringe 21 is desirably a PP resin or the like which is a resin capable of being thinly deformed. A material of the seal 22 is desirably an ultra high molecular PE resin or the like, which is frequently used for sealing liquid of a sliding portion and have excellent sliding properties. A material of the rubber stopper 23 is desirably a silicon rubber or the like which is stable with respect to analysis. A material of the cap 24 is desirably a PC resin or the like in order to be uniform with the film 55 of each container. The phoretic medium 26 is enclosed therein, and air 27 which has entered at the time of enclosing is enclosed so as to be accumulated at an upper portion. The phoretic medium 26 is enclosed in an amount with which the analysis can be performed 10 times. When the seal 22 is applied with a load from the outside, an inner portion of the syringe 21 can be operated.

FIG. 10 illustrates a detailed view of installation of the phoretic medium container 20. When the phoretic medium container 20 is set in the device, first, the film 55 attached to the cap 24 is peeled off. After that, the cap is inserted into a guide 101 embedded in the sample tray 100, and is fixed from the top so as not to be lifted. At this time, a gap between an outer diameter of the syringe 21 and an inner diameter of the guide 101 is made as small as possible. The smaller the gap is, the better, but the outer diameter of the syringe 21 of a resin molded article and the inner diameter of the guide 101 which is a machined article are set as a gap which is reasonable for processing. Specifically, the gap is approximately 0.1 mm.

Hereinafter, with reference to FIG. 11 to FIG. 13, a connection method of the capillary array 10 and the phoretic medium container 20, the anode side buffer solution container 30, and the cathode side buffer solution container 40 in the invention will be described.

FIG. 11 illustrates a connection state of the capillary array 10 and the cathode side buffer solution container 40. The cathode side buffer solution container 40 set in the sample tray 100 is connected to the fixed capillary array 10 by the Z axis driving of the auto-sampler unit 150. At the time of connecting, the film 55 is connected to an illustrated position by penetrating the SUS pipes 17. This connection method is the same as that of all of the waste liquid layer 41, the cathode side cleaning layer 42, and the buffer solution layer for cathode side electrophoresis 43.

FIG. 12 illustrates a connection state of the capillary array 10 and the anode side buffer solution container 30. The anode side buffer solution container 30 set in the sample tray 100 is connected to the fixed capillary array 10 by the Z axis driving of the auto-sampler unit 150. At the time of connecting, the film 55 is connected to an illustrated position by penetrating the capillary head 13 and the electrode 115. This connection method is the same as that of all of the anode side cleaning layer 31, the buffer solution layer for anode side electrophoresis 32, and the buffer solution layer for sample introduction 33, but only a depth of the anode side cleaning layer 31 to be inserted is changed.

When the anode side buffer solution container 30 and the cathode side buffer solution container 40 are connected, these containers may be connected by peeling off the film 55 without penetrating the film. In this manner, load with respect to the SUS pipes 17 or the capillary head 13 disappears, but when the cathode side buffer solution container 40 is set in the sample tray 100, the buffer solution or the cleaning liquid is able to be spilled, and the buffer solution or the cleaning liquid evaporates during analysis. Here, the upper portion of the container may be covered with not only the film 55 but also a rubber scepter with incision. Accordingly, the buffer solution or the cleaning liquid does not spill and is prevented from evaporating, thereby making it possible to reduce the load on the SUS pipes 17 or the capillary head 13.

FIG. 13 illustrates a connection state of the capillary array 10 and the phoretic medium container 20. The phoretic medium container 20 set in the sample tray 100 is connected to the fixed capillary array 10 by the Z axis driving of the auto-sampler unit 150. At the time of connecting, the container is connected by making the capillary head 13 penetrate the rubber stopper 23. Since the capillary head distal end 15 is a needle shape, the capillary head distal end is also capable of penetrating the rubber stopper 23. At this time, the electrode 115 has a positional relationship of not being in contact with the phoretic medium container 20. The capillary head 13 includes the capillary head boss 14 in which the outer diameter is great, and the capillary head is connected to the capillary head boss 14 by pressing down the upper surface of the rubber stopper 23 from the top. In addition, the air 27 also enters the upper portion inside the phoretic medium container 20, but the capillary head distal end 15 after being inserted is disposed so as to be positioned under the air 27.

At this time, the film 55 of the phoretic medium container 20 is peeled off and set, but the film 55 may penetrate the capillary head 13 by setting the film 55 without being peeled. Accordingly, the load on the capillary head 13 increases, but it is also possible to prevent forgetting to peel off the film 55, and workability of the user is improved.

Hereinafter, a workflow of analysis in the example will be described with reference to FIG. 14.

In Step 200, the user sets the capillary array 10 in the constant-temperature bath 110. In addition, the phoretic medium container 20, the anode side buffer solution container 30, the cathode side buffer solution container 40, and the sample container 50 are set in the sample tray 100. It is omitted in the drawings, but a barcode is attached to the capillary array 10, the phoretic medium container 20, the anode side buffer solution container 30, the cathode side buffer solution container 40, and the sample container 50, which are articles of consumption. When each of the articles of consumption is set in the device, the user reads information relating to the barcode of each of the articles of consumption using a barcode leader mounted in the device. Accordingly, a serial number, an expiration date, the number of times of use, or the like of each article of consumption can be managed.

In Step 201, the set capillary array 10 is maintained at a constant temperature by the constant-temperature bath 110.

In Step 202, due to movement of Y axis driving and Z axis driving of the auto-sampler unit 150, the capillary head 13 and the SUS pipes 17 of the capillary array 10 are respectively inserted into the anode side cleaning layer 31 and the cathode side cleaning layer 42. Accordingly, the capillary head 13 and the SUS pipes 17 are cleaned. The cleaning operation of the capillary head 13 side will be described later in detail with reference to FIG. 15 to FIG. 17.

In Step 203, due to movement of Y axis driving and Z axis driving of the auto-sampler unit 150, the capillary head 13 and the SUS pipes 17 of the capillary array 10 are respectively inserted into the phoretic medium container 20 and the waste liquid layer 41. In this state, the liquid feeding mechanism 60 is driven, and the phoretic medium 26 enclosed in the phoretic medium container 20 is fed to the capillaries 11. The liquid feeding operation will be described later in detail with reference to FIG. 18 to FIG. 24.

In Step 202, due to movement of Y axis driving and Z axis driving of the auto-sampler unit 150 again, the capillary head 13 and the SUS pipes 17 of the capillary array 10 are respectively inserted into the anode side cleaning layer 31 and the cathode side cleaning layer 42. Accordingly, the capillary head 13 and the SUS pipes 17 are cleaned.

In Step 204, due to movement of Y axis driving and Z axis driving of the auto-sampler unit 150, the capillary head 13 and the SUS pipes 17 of the capillary array 10 are respectively inserted into the buffer solution layer for sample introduction 33 and the sample container 50. At this time, the electrode 115 is also inserted into the buffer solution layer for sample introduction 33. Accordingly, both ends of each of the capillaries 11 are conducted. A high voltage is applied in this state, and the sample 51 is inserted into the capillaries 11.

In Step 202, due to movement of Y axis driving and Z axis driving of the auto-sampler unit 150 again, the capillary head 13 and the SUS pipes 17 of the capillary array 10 are respectively inserted into the anode side cleaning layer 31 and the cathode side cleaning layer 42. Accordingly, the capillary head 13 and the SUS pipes 17 are cleaned.

In Step 205, due to movement of Y axis driving and Z axis driving of the auto-sampler unit 150 again, the capillary head 13 and the SUS pipes 17 of the capillary array 10 are respectively inserted into the buffer solution layer for anode side electrophoresis 32 and the buffer solution layer for cathode side electrophoresis 43. At this time, the electrode 115 is also inserted into the buffer solution layer for sample introduction 33. Accordingly, both ends of each of the capillaries 11 are conducted. A high voltage is applied in this state, and electrophoresis is performed. The sample 51 on which the electrophoresis is performed is detected by the irradiation detecting unit 130.

In Step 202, due to movement of Y axis driving and Z axis driving of the auto-sampler unit 150 again, the capillary head 13 and the SUS pipes 17 of the capillary array 10 are respectively inserted into the anode side cleaning layer 31 and the cathode side cleaning layer 42. Accordingly, the capillary head 13 and the SUS pipes 17 are cleaned.

One analysis is finished by analyzing data detected due to this series of movements. In a case in which the analysis is continuously performed, the X driving member 95 on the sample tray 100 is driven, and the position of the sample container 50 is switched, such that the above-described operation is repeated.

Hereinafter, the cleaning operation of the capillary head 13 will be described in detail with reference to FIG. 15 to FIG. 17. The capillary head 13 is associated with contacting liquid with the phoretic medium 26 during the analysis. In a case in which the analysis is continuously performed, the buffer solution enters into the phoretic medium 26 at the time of contacting liquid. If the phoretic medium 26 in which the buffer solution is mixed is fed to the capillaries 11 as it is, the analysis properties deteriorate. In addition, the phoretic medium 26 has properties of crystallizing when dried. If the phoretic medium remains as being crystallized, the capillaries 11 are clogged when the liquid is fed, and there is a concern that the phoretic medium 26 cannot be fed. Further, the phoretic medium 26, which is crystallized, is inserted into a connection portion of the capillary head 13 and the phoretic medium container 20, and there is a concern that the phoretic medium 26 leaks at the time of feeding the liquid. Therefore, cleaning of the capillary head 13 is very important.

FIG. 15 illustrates initial cleaning in an analysis workflow in detail. The anode side cleaning layer 31 of the anode side buffer solution container 30 is inserted into the capillary head 13 and the electrode 115. At this time, as illustrated, the capillary head boss 14 part is inserted into the film 55 until a hole is made. After that, the anode side cleaning layer 31 is pulled out. The outer diameter of the capillary head boss 14 is greater than the outer diameter of the capillary head distal end 15, and an extension hole 150 greater than the capillary head distal end 15 is made to be empty on the film 55.

FIG. 16 illustrates a state of contacting liquid with the buffer solution in the analysis workflow in detail. The buffer solution layer for sample introduction 33 or the buffer solution layer for anode side electrophoresis 32 of the anode side buffer solution container 30 is inserted into the capillary head 13 and the electrode 115. At this time, as illustrated, insertion depths of these components are more shallow than a depth of a case of being inserted into an anode side cleaning liquid layer 31. Accordingly, a penetrating hole 151 is opened to the film 55, and the buffer solution adhered to the capillary head 13 is in a range of a buffer solution adhering range 155. It is omitted in the drawings, but the phoretic medium container 20 at the time of being connected is connected, so that a range of the phoretic medium 26 adhered to the capillary head 13 is the same as the range described above.

FIG. 17 illustrates cleaning in the analysis workflow in detail. After initial cleaning is performed on the capillary head 13 and the electrode 115 once, the anode side cleaning layer 31 of the anode side buffer solution container 30 is inserted thereto. As illustrated, the extension hole 150 is empty on the film 55 of the anode side cleaning layer 31. Since the extension hole 150 is greater than the outer diameter of the capillary head distal end 15, the capillary head distal end 15 does not come into contact with the film 55. Therefore, a part of the buffer solution adhering range 155 adhered to the capillary head distal end 15 does not come into contact with the film 55, and can be cleaned by the anode side cleaning liquid 35. In addition, since the insertion depth is also deep, the cleaning can be performed up to a cleaning range 156, and the entire part of the buffer solution adhering range 155 adhered to the capillary head 13 can be cleaned.

The cleaning is performed by this series of operations, but speed at the time of pulling out each solution capillary head 13 slows down extremely. Accordingly, an original amount of solution to be adhered to the capillary head 13 is reduced, and a carrying amount of the solution is reduced.

In a case in which efficiency of the cleaning is desired to be increased, two of the anode side cleaning layers 31 may be provided. In addition, the upper portion of the container may be covered not with the film 55 but with a rubber scepter with incision, and a method of wiping the solution adhered to the capillary head 13 may be used. If the number of continuously performing analysis is small, an amount of the buffer solution mixed with the phoretic medium 26 is reduced. In this case, the cleaning operation itself is not required.

Hereinafter, the liquid feeding operation of the phoretic medium 26 will be described in detail with reference to FIG. 18 to FIG. 24.

FIG. 18 illustrates a view of an initial state, which is a series of movements of an injecting operation of the phoretic medium 26. As described above, the phoretic medium container 20 is set by being inserted into the guide 101 embedded in the sample tray 100. At this time, the plunger 61 of the liquid feeding mechanism 60 is disposed directly under the phoretic medium container 20, and the seal 22 inside the phoretic medium container 20 can be operated by moving the plunger 61.

FIG. 19 illustrates a view of a contact detection state of the plunger 61, which is a series of movements of the injecting operations of the phoretic medium 26. First, as illustrated in FIG. 18, the plunger 61 of the liquid feeding mechanism 60 is brought into contact with the seal 22 inside the phoretic medium container 20, so that a position thereof is detected. The stepping motor 62 of the liquid feeding mechanism 60 is driven with a weak driving current, and the stepping motor 62 is stepped out at the time of coming into contact with the seal 22. In order to reduce the load on the seal 22, the driving current of the stepping motor 62 is adjusted so that a thrust force of the plunger 61 at this time is approximately 10 N. The contact of the plunger 61 is detected by detecting stepping-out of the stepping motor 62 at this time with the rotary encoder 63. When the contact position of the plunger 61 is detected, an amount of the phoretic medium 26 inside the phoretic medium container 20 is accurately checked so as to be capable of being used for managing an amount of liquid being fed or detecting liquid leaking. After the contact of the plunger 61 is detected, the plunger 61 is excited with a larger current than a current at the time of driving, and is held at a position where the seal 22 is in contact. A current value at the time of exciting is desirably set to a current value which is capable of maintaining the thrust force equal to a pressure generated at the time of feeding the phoretic medium 21.

FIG. 20 illustrates a view of a connection state of the capillary head 13, which is a series of movements of the injecting operations of the phoretic medium 26. Due to the movement of the Z axis driving member 90 of the auto-sampler unit 150, the capillary head 13 and the phoretic medium container 20 are connected. As described above, the sharp capillary head distal end 15 penetrates through and is connected to the rubber stopper 23 inside the phoretic medium container 20. Since the plunger 61 of the liquid feeding mechanism 60 is mounted on the Z driving member 90 of the auto-sampler unit 150, the plunger 61 is connected to the seal 22 in a state of being in contact. In addition, as described above, the plunger 61 is connected to the capillary head boss 14 by pressing down the upper surface of the rubber stopper 23 from the top. At this time, the capillary head 13 is inserted into the phoretic medium container 20 by the rubber stopper 23 in a state of being sealed. Accordingly, a volume change inside the phoretic medium container 20 occurs, and a pressure inside the phoretic medium container 20 increases; however, since the plunger 61 presses the seal 22 down, the seal 22 is not operated.

FIG. 21 illustrates a view of an injection state of the phoretic medium 26, which is a series of movements of the injecting operations of the phoretic medium 26. After the connection of the capillary head 13, the seal 22 is operated by driving the plunger 61 with the liquid feeding mechanism 60, the volume inside the phoretic medium container 20 is changed, such that the liquid is fed. At this time, the inside of the phoretic medium container 20 is highly pressurized, and each component of the phoretic medium container 20 expands. Since the phoretic medium container 20 at this time has low stiffness, the amount of expansion thereof is great, and the container becomes unstable. Therefore, the expansion of the phoretic medium container 20 causes great influence on sealing properties of the phoretic medium 26.

Here, the guide 101 suppresses the expansion of the syringe 21. In addition, the capillary head 13 suppresses the expansion of the rubber stopper 23. Further, since a shape of the seal 22 is a recessed shape, when the seal 22 expands due to the inner pressure, the inside thereof becomes more sealed. The seal 22 is formed in a shape or a stiffness easy to expand more than the syringe 21, and the influence due to the expansion of the syringe 21 can be reduced. Specifically, a thickness of the syringe 21 is set to 1 mm, and a thickness of the seal 22 is set to approximately 0.6 mm, such that there are differences in expansion factors.

Accordingly, influence due to the expansion on the sealing properties is reduced. However, no matter how much the expansion amount reduces, the expansion amount cannot be removed. The expansion amount is varied so as to affect the management of an amount of liquid feeding.

Here, first, the stepping motor 62 is driven by a driving current which is a pressure required to feed liquid, and the plunger 61 is driven. A pressure required for feeding liquid at this time is set to 3 MPa, and in order to generate the pressure, the driving current of the stepping motor 62 is adjusted so that a thrust force of the plunger 61 is set to 75 N. Accordingly, the inside of the phoretic medium container 20 expands, but the stepping motor 62 performs stepping-out when the inner pressure is increased as much as needed. At this time, since the phoretic medium container 20 becomes expanded, the stepping-out is detected by the rotary encoder 63. Even after the stepping-out is detected, the stepping motor 62 performs stepping-out and is continuously driven. Since the phoretic medium 26 is gradually fed into the capillaries 11, the plunger 61 is gradually driven. Also, after detecting that the phoretic medium container 20 expanded, an amount being driven by the plunger 61 is detected by the rotary encoder 63, and the amount as much as required for the phoretic medium 26 is fed to the capillaries 11. With such a liquid feeding method, the amount of liquid feeding can be managed without receiving an influence due to the expansion of the phoretic medium container 20.

FIG. 22 and FIG. 23 illustrate a view of an operation of removing a residual pressure inside the phoretic medium container 20 in detail, which is a series of movements of the injecting operations of the phoretic medium 26. After the liquid feeding is completed, the plunger 61 of the liquid feeding mechanism 60 is dropped as illustrated in FIG. 21, and the contact with the seal 22 is released. After the liquid feeding is completed, the pressure inside the phoretic medium container 20 remains high. However, according to this operation, as illustrated in FIG. 22, the seal 22 is pressed back due to the pressure inside the phoretic medium container 20, and the residual pressure inside the phoretic medium container 20 is removed.

FIG. 24 illustrates a view of a connection releasing operation of the capillary head 13 in detail, which is a series of movements of the injecting operations of the phoretic medium 26. Due to the movement of the Z axis driving member 90 of the auto-sampler unit 150, connection of the capillary head 13 and the phoretic medium container 20 is released. At this time, since the residual pressure inside the phoretic medium container 20 is removed by previous operation, there is no need to consider spattering of the phoretic medium 26 at the time of releasing the connection of the capillary head 13 and the phoretic medium container 20. By the operation described above, the phoretic medium 26 is fed to the capillaries 11.

When applying this structure and the liquid feeding operation described above, the expansion of the phoretic medium container 20 is suppressed and influence due to the expansion is reduced, and thereby making it possible to manage the amount of liquid feeding. In addition, the above-described aspect can be realized as an inexpensive phoretic medium container having a function of liquid feeding. Accordingly, both reduction of running costs and improvement of workability of the user can be realized.

Example 2

When contacting of the plunger 61 at the time of the liquid feeding operation is detected, a separate sensor may be provided. If the plunger 61 is in contact with the seal 22, a spring is bent, and the detection plate may partition the sensor by the bending. Otherwise, a contact type switch may be mounted.

Example 3

When residual pressure is removed at the time of the liquid feeding operation, as sliding resistance of the seal 22, the residual pressure inside the phoretic medium container 20 is remained. Here, the plunger 61 and the seal 22 are fixed, and the residual pressure may be removed by forcedly lowering the seal 22. At this time, a mechanism for fixing the plunger 61 and the seal 22 is needed, but the residual pressure due to sliding resistance of the seal 22 can be also removed.

Example 4

FIG. 25 illustrates another aspect of the phoretic medium container 20. In FIG. 25, the aspect thereof is the phoretic medium container 20 in which a bottom of the syringe 21 is sealed and the rubber stopper 23 having a function same as that of the seal 22 is embedded. Due to only the movement of the Z axis driving member 90 of the auto-sampler unit 150, the capillary head 13 penetrates the rubber stopper 23 of the phoretic medium container 20, the capillary head 13 is further pushed, and thus the phoretic medium 26 can be also fed to the capillaries 11. At this time, a force for penetrating the rubber stopper 23 to the capillary head 11 is greater than a sliding resistance at the time of feeding liquid. When this aspect is applied, the liquid feeding mechanism 60 itself can be also eliminated.

Example 5

As illustrated in FIG. 26, the auto-sampler unit 150 may be divided into an anode side and a cathode side. In addition, the X axis driving member 95 for switching the sample is mounted on the sampler base 80 but not on the sample tray 100, and may be driven in an X axis of each sample tray 100. Further, the electrode 115 of the anode side may be integrated with the capillary head 13. The capillary head 13 is made of a material capable of being electrically conducted, and a voltage is dropped to GND at the time of fixing the capillary head 13, and thus the electrode 115 itself is not needed.

Example 6

A plurality of the phoretic medium containers 20 may be set. When the plurality of phoretic medium containers are set, it is possible to increase the number of continuously performing RUN. Otherwise, according to the number of continuously performing RUN, an amount of the phoretic medium 26 enclosed in the phoretic medium container 20 may be varied. In addition, since the type of the phoretic medium container 20 is set to one, the phoretic medium 26 as 1 RUN is enclosed in the phoretic medium container 20, and the phoretic medium container may be set as much as the number of continuously performing RUN.

Example 7

The type of the phoretic medium 26 enclosed in the phoretic medium container 20 may be pluralized. There are multiple types of the phoretic mediums 26, and the appropriate phoretic medium 26 is different depending on contents of the analysis. Here, when the structure of the phoretic medium container 20 is set to be the same, and the types of the phoretic medium. 26 enclosed therein are changed, it is possible to correspond to various analyses. The management at this time is performed using barcodes attached to the phoretic medium container 20.

REFERENCE SIGNS LIST 10 capillary array
11 capillary
12 detecting unit
13 capillary head
14 capillary head boss
15 capillary head distal end
16 load header
17 SUS pipe
20 phoretic medium container
21 syringe
22 seal
23 rubber stopper
24 cap
26 phoretic medium
27 air
30 anode side buffer solution container
31 anode side cleaning layer
32 buffer solution layer for anode side electrophoresis
33 buffer solution layer for anode side sample introduction 35 anode side cleaning liquid
36 buffer solution for anode side electrophoresis
37 buffer solution for anode side sample introduction
40 cathode side buffer solution container
41 waste liquid layer
42 cathode side cleaning layer
43 buffer solution layer for cathode side electrophoresis
45 waste liquid received liquid
46 cathode side cleaning liquid
47 buffer solution for cathode side electrophoresis
50 sample container
51 sample
55 film
56 partition
60 liquid feeding mechanism
61 plunger
62 stepping motor
63 rotary encoder
64 origin sensor
65 ball screw
66 linear guide
67 driving pulley
68 driven pulley
69 belt
70 liquid feeding mechanism base
71 slider
72 detection plate
80 sampler base
85 Y driving member
90 Z driving member
95 X driving member
100 sample tray
101 guide
110 constant-temperature bath
115 electrode
120 constant-temperature bath door
130 irradiation detecting unit
150 auto-sampler unit
160 irradiation detecting and constant-temperature bath
200 chart of analysis workflow (each of articles of consumption set)
201 chart of analysis workflow (temperature adjusting of capillary)
202 chart of analysis workflow (cleaning of capillary)
203 chart of analysis workflow (feeding of phoretic medium)
204 chart of analysis workflow (sample introduction)
205 chart of analysis workflow (electrophoresis)
206 chart of analysis workflow (finish of analysis)

The invention claimed is:

1. An electrophoresis device comprising:
capillaries;
a capillary head that is provided at a distal end of the capillaries;
a phoretic medium container that is used for electrophoresis and filled with a phoretic medium;
a liquid feeding mechanism that is provided with a plunger and feeds the phoretic medium in the phoretic medium container to the capillaries; and
a flat plate that holds the phoretic medium container;
wherein the phoretic medium container is provided with a syringe, a seal member that seals the phoretic medium in the syringe from below and is operated within the syringe by pressing with the plunger, and an elastic body that seals an upper part of the syringe, and
wherein the capillary head is inserted into the phoretic medium container and presses the elastic body,
an anode side buffer solution container mounted on the flat plate;
a cathode side buffer solution container mounted on the flat plate;
a sample container mounted on the flat plate;
a first driving unit that drives the flat plate in a first direction parallel to a surface of the flat plate; and
a second driving unit that drives the flat plate in a second direction perpendicular to the surface of the flat plate;
wherein the cathode side buffer solution container and the sample container are disposed in parallel in the first direction,
wherein the cathode side buffer solution container is provided with a waste liquid vessel, a cathode side cleaning vessel, and a buffer solution vessel for cathode side electrophoresis,
wherein the waste liquid vessel, the cathode side cleaning vessel, and the buffer solution vessel for cathode side electrophoresis are sequentially partitioned and provided in the first direction, and
wherein the phoretic medium container and the waste liquid vessel are disposed in parallel in a third direction orthogonal to the first direction on the surface of the flat plate.

2. The electrophoresis device according to claim 1, wherein a distal end of the capillary head has an acute angle.

3. The electrophoresis device according to claim 1, wherein the capillary head has a capillary head distal end and a capillary head boss which outer diameter is greater than that of the capillary head distal end, and the elastic body is pressed by the capillary head boss.

4. The electrophoresis device according to claim 1, wherein the capillary head can move relative to the phoretic medium container and is releasably connected to the phoretic medium container.

5. The electrophoresis device according to claim 1, further comprising:
a third driving unit that drives the sample container in a third direction orthogonal to the first direction on the surface of the flat plate.

6. The electrophoresis device according to claim 1, wherein the seal member has a greater expansion factor than that of the syringe.

7. The electrophoresis device according to claim 1, wherein the capillary head is integrated with an electrode of an anode side.

8. The electrophoresis device according to claim 1, further comprising:
a contact position detecting unit that detects a position where the plunger is in contact with the seal member.

9. An electrophoresis device comprising:
capillaries;
a capillary head that is provided at a distal end of the capillaries;
a phoretic medium container that is used for electrophoresis and filled with a phoretic medium;
a liquid feeding mechanism that is provided with a plunger and feeds the phoretic medium in the phoretic medium container to the capillaries;
a flat plate that holds the phoretic medium container;
wherein the phoretic medium container is provided with a syringe, a seal member that seals the phoretic medium in the syringe from below and is operated within the syringe by pressing with the plunger, and an elastic body that seals an upper part of the syringe; and wherein the capillary head is inserted into the phoretic medium container and presses the elastic body;
an anode side buffer solution container mounted on the flat plate;
a cathode side buffer solution container mounted on the flat plate;
a sample container mounted on the flat plate;
a first driving unit that drives the flat plate in a first direction parallel to a surface of the flat plate; and
a second driving unit that drives the flat plate in a second direction perpendicular to the surface of the flat plate;
wherein the phoretic medium container and the anode side buffer solution container are disposed in parallel in the first direction,
wherein the anode buffer solution container is provided with an anode side cleaning vessel, a buffer solution vessel for anode side electrophoresis, and a buffer solution vessel for anode side sample introduction,
wherein the anode side cleaning vessel, the buffer solution vessel for anode side electrophoresis, and the buffer solution vessel for anode side sample introduction are sequentially partitioned and provided in the first direction, and
wherein the buffer solution vessel for anode side sample introduction and the sample container are disposed in parallel in a third direction orthogonal to the first direction on the surface of the flat plate.

10. The electrophoresis device according to claim 1, wherein the seal member is a recessed shape.

* * * * *